United States Patent
Hayden et al.

(10) Patent No.: US 11,471,860 B2
(45) Date of Patent: Oct. 18, 2022

(54) COMPOSITION

(71) Applicant: Ilika Technologies Limited, Southampton (GB)

(72) Inventors: Brian Elliott Hayden, Southampton (GB); Christopher Vian, Southampton (GB); Kieren Bradley, Southampton (GB); Hugo Jungius, Southampton (GB); Kyriakos Giagloglou, Southampton (GB)

(73) Assignee: Ilika Technologies Limited, Romsey (GB)

( * ) Notice: Subject to any disclaimer, the term of this patent is extended or adjusted under 35 U.S.C. 154(b) by 276 days.

(21) Appl. No.: 16/573,004

(22) Filed: Sep. 17, 2019

(65) Prior Publication Data
US 2020/0129959 A1   Apr. 30, 2020

(30) Foreign Application Priority Data
Sep. 18, 2018   (GB) .................................... 1815165

(51) Int. Cl.
*B01J 23/00* (2006.01)
*B01J 35/00* (2006.01)
(Continued)

(52) U.S. Cl.
CPC .......... *B01J 23/002* (2013.01); *B01J 35/006* (2013.01); *B01J 35/008* (2013.01);
(Continued)

(58) Field of Classification Search
None
See application file for complete search history.

(56) References Cited

U.S. PATENT DOCUMENTS 6,692,855 B1 * 2/2004 Aizawa ............... H01M 4/9033
                                                        429/479
9,901,915 B2 * 2/2018 Ifrah ..................... B82Y 30/00
2017/0232387 A1    8/2017 Qi et al.

OTHER PUBLICATIONS

Zhu, Synthesis of lanthanum chromite-lanthanum manganite and LSCF-Lanthanum manganite core-shell particles via molten salt route, Boston University Thesis & Dissertations, 2017 (Year: 2017).*

(Continued)

*Primary Examiner* — Sheng H Davis
*Assistant Examiner* — Keling Zhang
(74) *Attorney, Agent, or Firm* — Renner, Otto, Boisselle & Sklar, LLP

(57) ABSTRACT

A composition consisting essentially of a perovskite crystalline structure includes ions of a first metal M1 which occupies an A-site of the perovskite crystalline structure and ions of a second metal M2 which occupies a B-site of the perovskite crystalline structure. M2 has two oxidation states capable of forming a redox couple suitable for reversibly catalyzing an oxygen reduction reaction (ORR) and an oxygen evolution reaction (OER). The composition also includes ions of a third metal M3 at least a portion of which substitutes for M1 in the A-site of the perovskite crystalline structure, and at least a portion of which optionally also substitutes for M2 in the B-site of the perovskite crystalline structure. At least some of the ions of M3 have a different oxidation state to the ions of M1. The composition also includes atoms of an element X, which is a chalcogen.

44 Claims, 19 Drawing Sheets

(51) Int. Cl.
  *C01G 45/12* (2006.01)
  *C01G 53/00* (2006.01)
  *H01M 4/86* (2006.01)
  *H01M 4/90* (2006.01)
  *B82Y 40/00* (2011.01)

(52) U.S. Cl.
  CPC ...... *B01J 35/0086* (2013.01); *C01G 45/1264* (2013.01); *C01G 53/70* (2013.01); *H01M 4/8652* (2013.01); *H01M 4/9041* (2013.01); *B82Y 40/00* (2013.01); *C01P 2002/34* (2013.01); *C01P 2002/72* (2013.01); *C01P 2004/64* (2013.01); *C01P 2006/40* (2013.01)

(56) References Cited

OTHER PUBLICATIONS

Silva et al., Synthesis and electrocatalytic properties of La0.8Sr0.2FeO3-δ perovskite oxide for oxygen reactions, AIMS Materials Science, 2017, 4, 991-1009 (Year: 2017).*
Goldschmidt, "Die Gesetze der Krystallochemie," Heft, 21, 1926, pp. 477-485.
Hayden, B. E. et al; "Oxygen reduction and oxygen evolution on SrTi1-xFexO3-y(STFO) perovskite electrocatalysts"; Journal of Electroanalytical Chemistry, vol. 819, Jun. 15, 2018; pp. 275-282.
Tulloch et al.; "Activity of perovskite La1-xSrxMnO3 catalysts towards oxygen reduction in alkaline electrolytes"; Journal of Power Sources, vol. 188, Dec. 13, 2008; pp. 359-366.
Demina et al.; "Phase Equilibria and Crystal Structures of Mixed Oxides in the La—Mn—Ni—O System"; Inorganic Materials, vol. 41, No. 7, Jan. 16, 2005, pp. 736-742.
Sunarso, Jaka et al.; "Oxygen Reduction Reaction Activity of La-Based Perovskite Oxides in Alkaline Medium: A Thin-Film Rotating Ring-Disk Electrode Study." The Journal of Physical Chemistry C, vol. 116, No. 9, 2012, pp. 5827-5834.
Search Report issued by UKIPO in corresponding GB Application No. 1815165.4 dated May 21, 2019.
David, A. et al., High-Throughput Synthesis and Characterization of (BaxSr1-x)1+yTi1-yO3-δ and (BaxSr1-x)1+yTi1-yO3-zNz Perovskite Thin Films, Cryst. Growth Des., 2014, 14, 523-532.
Ryabova, A. S. et al., Rationalizing the Influence of the Mn(IV)/Mn(III) Red-Ox Transition on the Electrocatalytic Activity of Manganese Oxides in the Oxygen Reduction Reaction, Electrochimica Acta, 2016, 187, 161-172.
Tkach, A. et al., Structure-microstructure-dielectric tunability relationship in Mn-doped strontium titanate ceramics, Acta Materialia, 2005, 53, 5061-5069.
Hayden, B. E. and Yakovlev, S., Structural, dielectric and ferroelectric properties of (Bi,Na)TiO3-BaTiO3 system studied by high throughput screening, Thin Solid Films, 2016, 603, 108-114.
Guerin, Samuel et al., A Combinatorial Approach to the Study of Particle Size Effects on Supported Electrocatalysts: Oxygen Reduction on Gold, J. Comb. Chem. 2006, 8, 679-686.
Doroftei, C. et al., Study of the influence of nickel ions substitutes in barium stannates used as humidity resistive sensors, Sens. Actuators, A, 2012, 173, 24-29.
Singh, C. and Rakesh, M., Preparation and characterization of nickel doped, A and B Site LaCoO3 perovskite, Indian J. Eng. Mater. Sci., 2009, 16, 288-290.
Yada C., et al., A High-Throughput Approach Developing Lithium-Niobium-Tantalum Oxides as Electrolyte/Cathode Interlayers for High-Voltage All-Solid-State Lithium Batteries, J. Electrochem. Soc., 2015, 162, A722-A726.
Zener, Clarence, Interaction between the d-Shells in the Transition Metals. II. Ferromagnetic Compounds of Manganese with Perovskite Structure, Phys. Rev., 1951, 82, 3.

Chen, D. et al., Nonstoichiometric Oxides as Low-Cost and Highly-Efficient Oxygen Reduction/Evolution Catalysts for Low-Temperature Electrochemical Devices, Chem. Rev., 2015, 115, 9869-9921.
Fabbri, Emiliana et al., Ba0.5Sr0.5Co0.8Fe0.2O3-δ Perovskite Activity towards the Oxygen Reduction Reaction in Alkaline Media, ChemElectroChem, 2014, 1, 338-342.
Su, Hai-Yan et al., Identifying active surface phases for metal oxide electrocatalysts: a study of manganese oxide bi-functional catalysts for oxygen reduction and water oxidation catalysis, Phys. Chem. Chem. Phys., 2012, 14, 14010-14022.
Hu, Jie et al., Preparation of La1-xCaxMnO3 perovskite-graphene composites as oxygen reduction reaction electrocatalyst in alkaline medium, J. Power Sources, 2014, 269, 144-151.
Kang, J. S. et al., Investigation of valence states and electronic structure of ferromagnetic double-perovskite La 2 MnNiO 6 by using synchrotron radiation, Journal of Applied Physics, 2009, 105, 07d721.
Suntivich, Jin et al., A Perovskite Oxide Optimized for Oxygen Evolution Catalysis from Molecular Orbital Principles, 2011, 3, 546-550.
Suntivich, Jin et al., Design principles for oxygen-reduction activity on perovskite oxide catalysts for fuel cells and metal-air batteries, Science, 2011, 334, 1383-1385.
Stoerzinger, Kelsey A. et al., Oxygen electrocatalysis on (001)-oriented manganese perovskite films: Mn valency and charge transfer at the nanoscale, Energy Environ. Sci., 2013, 6, 1582-1588.
Stoerzinger, Kelsey A. et al., Highly Active Epitaxial La(1-x)SrxMnO3 Surfaces for the Oxygen Reduction Reaction: Role of Charge Transfer, Journal of Physical Chemistry Letters, 2015, 6, 1435-1440.
Suresh, K. et al., Synthesis and properties of La1-x SrxFeO3, Solid State Ionics, 1999, 126, 299-305.
Sanchez, M.C. et al., Local electronic and geometrical structure of LaNi1-xMnxO3+δ perovskites determined by x-ray-absorption spectroscopy, Phys. Rev. B: Condens. Matter Mater. Phys., 2002, 65, 144409.
Sayagues, M.J. et al., Room temperature mechanosynthesis of the La1-xSrxMnO3±δ (0≤ x ≤1) system and microstructuralstudy, J. Solid State Chem., 2012, 188, 11-16.
Iliev, M.N. et al., Raman spectroscopy evidence of strong spin-phonon coupling in epitaxial thin films of the double perovskite La2NiMnO6, Appl. Phys. Lett., 2007, 90, 151914.
Darby, Mark S. B. et al.,High throughput physical vapour deposition and dielectric and ferroelectric screening of (Bi,Na)TiO3 thin-film libraries, J. Appl. Phys., 2013, 113, 014104.
Beal, Mark S. et al., High Throughput Methodology for Synthesis, Screening, and Optimization of Solid State Lithium Ion Electrolytes, ACS Comb. Sci., 2011, 13, 375-381.
Wolcyrz, M. et al., Structural defects in LaMnO3 phase studied by neutron diffraction, J. Alloys Compd., 2003, 353, 170-174.
Yuasa, Masayoshi et al., Durability of Carbon-Supported La—Mn-Based Perovskite-Type Oxides as Oxygen Reduction Catalysts in Strong Alkaline Solution, J. Electrochem. Soc., 2011, 158, A411-A416.
Ramaswamy, Nagappan, et al., Electrochemical Kinetics and X-ray Absorption Spectroscopic Investigations of Oxygen Reduction on Chalcogen-Modified Ruthenium Catalysts in Alkaline Media, 2011, 115, 12650-12664.
Shannon, R. D., Revised Effective Ionic Radii and Systematic Studies of Interatomic Distances in Halides and Chalcogenides, Acta Cryst., 1976, A32, 751-767.
Gao, Rui et al., The role of oxygen vacancies in improving the performance of CoO as a bifunctional cathode catalyst for rechargeable Li—O2 batteries, J. Mater. Chem. A, 2015, 3, 17598-17605.
Horyn, R. et al., Polymorphic forms and defect structure formation within homogeneity domain of LaMnO3 phase, Journal of Alloys Compounds, 2003, 353, 153-169.
Helmolt, R. Von et al., Giant Negative Magnetoresistance in Perovskite-like La2/3Ba1/3MnOx Ferromagnetic Films, Phys. Rev. Lett., 1993, 71, 2331-2333.

(56) References Cited

OTHER PUBLICATIONS

Guerin, Samuel and Hayden, Brian E., Physical Vapor Deposition Method for the High-Throughput Synthesis of Solid-State Material Libraries, J. Comb. Chem., 2006, 8, 66-73.

Jin, S. et al., Thousandfold Change in Resistivity in Magnetoresistive La—Ca—Mn—O Films, Science, 1994, 264, 413-415.

Ponce, S. et al., Surface properties and catalytic performance in methane combustion of Sr-substituted lanthanum manganites, Appl. Catal., B, 2000, 24, 193-205.

Celorrio, Veronica et al., Oxygen Reduction at Lanthanides: The Role of the B-site, ChemElectroChem, 2016, 3, 283-291.

Celorrio, Veronica et al., Oxygen reduction reaction at LaxCa1-xMnO3 nanostructures: interplay between A-site segregation and B-site valency, Catal. Sci Technol., 2016, 6, 7231-7238.

Pon-On, Weeraphat et al., Influence of manganese substitution into the A-site of perovskite type Ca1-xMnxTiO3 ceramic, Ceram. Int., 2011, 37, 2075-2079.

Wei, Zhong et al., Review of magnetocaloric effect in perovskite-type oxides, Chin. Phys. B, 2013, 22, 11.

Singh, R. N. et al., Preparation and characterization of thin films of LaNiO3 for anode application in alkaline water alectrolysis, Journal of Applied Electrochemistry, 1994, 24, 149-156.

Liu, Xiliang et al., Electrochemical property assessment of Sr-doped LaNi0.5Mn0.5O3-δ as cathode for intermediate-temperature solid oxide fuel cells, Int. J. Hydrogen Energy, Int. J. Hydrogen Energy, 2016, 41, 22361-22372.

Yuan, Xiao-Zo, et al., Electrocatalytic Activity of Non-Stoichiometric Perovskites toward Oxygen Reduction Reaction in Alkaline Electrolytes, ECS Trans., 2011, 35, 11-20.

Zuo, Yanbo et al., JDetermination of A-site deficiency in lanthanum manganite by XRD intensity ratio, J. Solid State Chem., 2008, 181, 700-704.

Zhu, Yinlong et al., Enhancing Electrocatalytic Activity of Perovskite Oxides by Tuning Cation Deficiency for Oxygen Reduction and Evolution Reactions, Chem. Mater., 2016, 28, 1691-1697.

Arnold, Z. et al., Pressure effect on yttrium doped La0.60Y0.07Ca0.33MnO3 compound, Appl. Phys. Lett., 1995, 67, 2875-2877.

Zener, Clarence, *Interaction between the d-Shells in the Transition metals. II. Ferromagnetic Compounds of Manganese with Perovskite Structure*, Ferromagnetic Compounds of Manganese, vol. 82, No. 3, pp. 403-405, Institute for the Study of Metals, University of Chicago, Chicago, Illinois, May 1, 1951.

Singh, et al., Preparation and Characterization of thin films of $LaNiO_3$ for anode application in alkaline water electrolysis, Journal of applied Electrochemistry 24 (1994), pp. 149-156, Jul. 15, 1993.

Radaelli, et al., *Charge, orbital, and magnetic ordering in Lao.5Cao.5MnO3*, vol. 55, No. 5, Physical Review B, p. 3015-3023, Feb. 1, 1997.

Falcon, et al., *Crystal Structure Refinement and Stability of LaFexNi1-xO3 Solid Solutions*, Journal of Solid state Chemistry 133, Article No. SC977477, pp. 379-385, May 21, 1997.

Pena, et al., *Chemical Structures and Performance of Perovskite Oxides*, Chem. Rev. 2001, 101, pp. 1981-2017, Sep. 28, 2000.

Guerin, et al., *Combinatorial Electrochemical Screening of Fuel Cell Electrocatalysts*, J. Comb. Chem 2004, 6, Johnson Matthey Technology Centre, Reading, United Kingdom, pp. 149-158, Jun. 24, 2003.

Guerin, et al., *High-Throughput Synthesis and Screening of Ternary Metal Alloys for Electrocatalysis*, J. Phys. Chem. B 2006, 110, pp. 14355-14362, School of Chemistry, University of Southampton, Southampton, United Kingdom, May 9, 2006.

Sayagues, et al., Room temperature mechanosynthesis of the $La_{1-x}Sr_xMnO_{3\pm s}$ ($0 \le - \le 1$) system and microstructural study, Journal of Solid State Chemistry 188 (2012) pp. 11-16, Jan. 20, 2012.

Hall, et al., *The Electrochemistry of Metallic Nickel: Oxides, Hydroxides, Hydrides and Alkaline Hydrogen Evolution*, Journal of Electrochemical Society, 160 (3) pp. F235-F243, Ontario, Canada, Jan. 4, 2013.

Celorrio, et al., *Oxygen Reduction at Lanthanides: The Role of the B-site.*, Article in ChemElectroChe, ResearchGate, p. 1-10, Dec. 11, 2015.

Krishnan, et al., *Dopants in Lanthanum Manganite: Insights from First-Principles Chemical Spade Exploration*, The Journal of Physical Chemistry, Article, pubs.acs.org/JPCC, pp. 22126-22133, Storrs, Connecticut, Jul. 26, 2016.

Guerin, et al., *Physical Vapor Deposition Method for the High-Throughput Synthesis of Solid-State Material Libraries*, Journal of Combinatorial Chemistry, vol. 8, No. 1, School of Chemistry, University of Southampton, pp. 66-73, Southampton, United Kingdom, Sep. 8, 2005.

\* cited by examiner

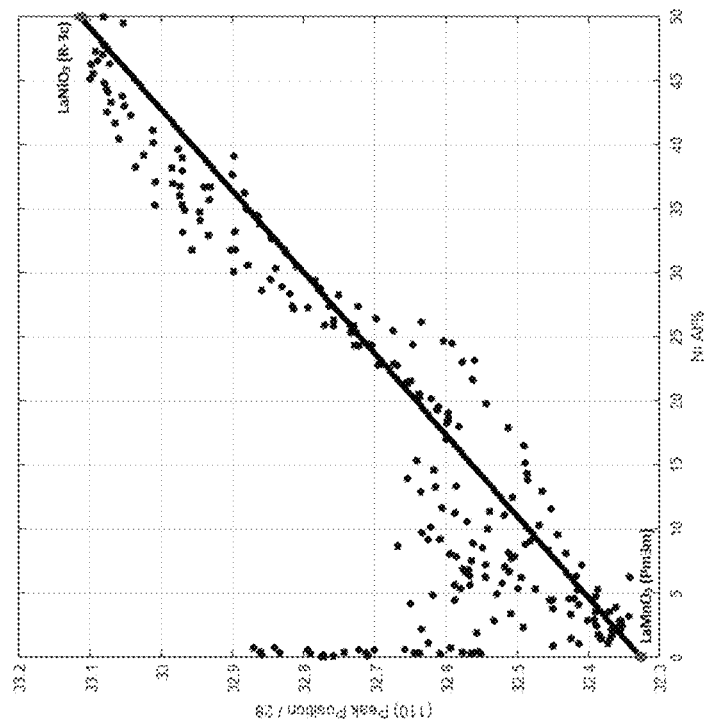
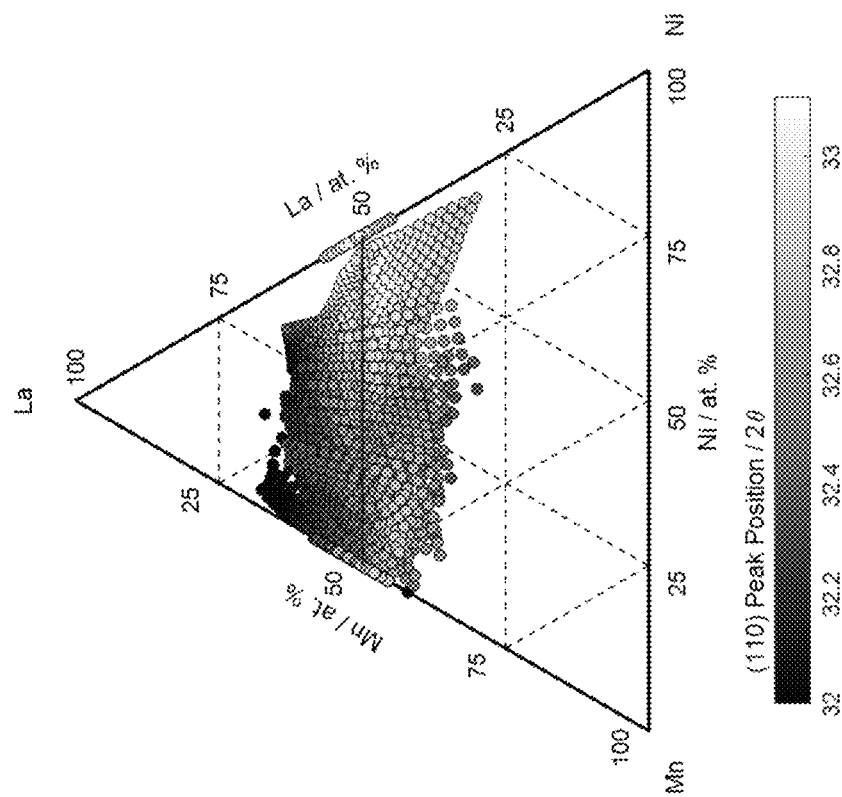
Fig 2B
Fig 2A

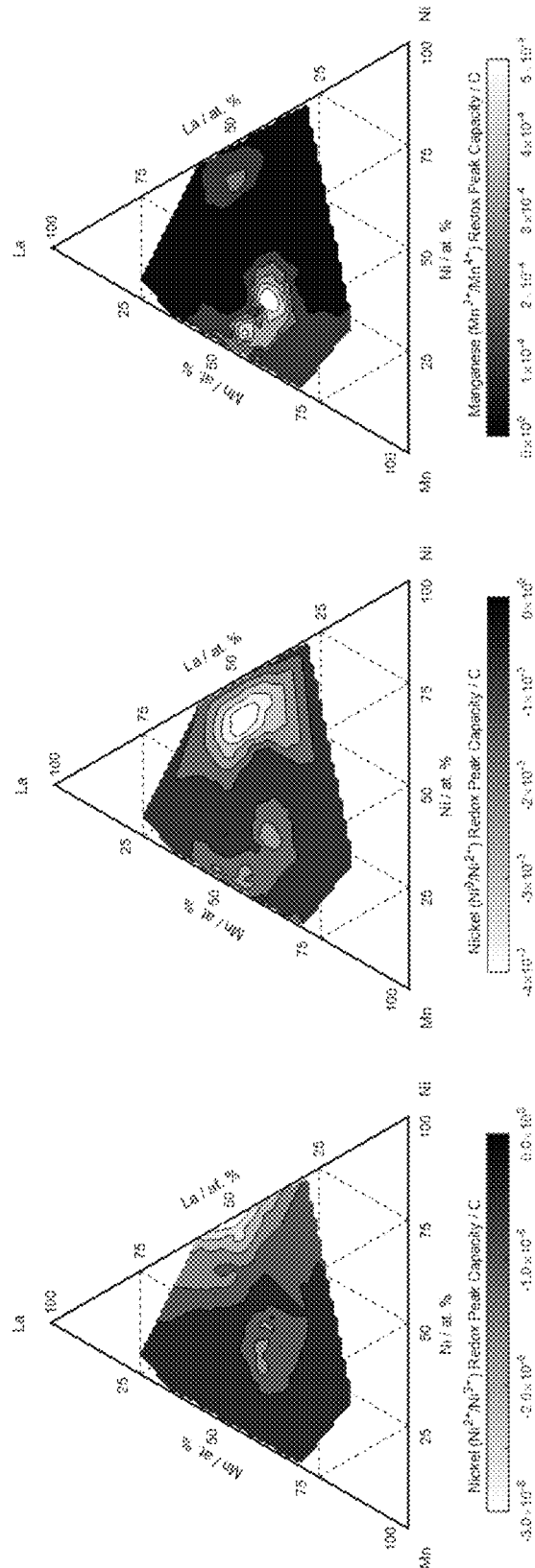

COMPOSITION

RELATED APPLICATION

This application claims priority to United Kingdom Patent Application No. GB 1815165.4 filed Sep. 18, 2018, which is hereby incorporated herein by reference.

FIELD OF THE INVENTION

This invention relates to a composition. It also relates to a method for preparing the composition, use of the composition as a catalyst, and a cell, particularly a fuel cell, containing the composition.

BACKGROUND TO THE INVENTION

A fuel cell is an electrochemical cell that converts a source fuel and an oxidant into an electrical current. It generates electricity inside a cell through reactions between a fuel and an oxidant, triggered in the presence of an electrolyte. The reactants flow into the cell, and the reaction products flow out of it, while the electrolyte remains within it. Fuel cells can operate virtually continuously as long as the necessary flows are maintained.

A fuel cell comprises a fuel electrode (anode), an oxidizer electrode (cathode), an electrolyte interposed between the electrodes and means for separately supplying a stream of fuel and a stream of oxidant to the anode and the cathode, respectively. In operation, fuel supplied to the anode is oxidized releasing electrons which are conducted via an external circuit to the cathode. At the cathode the supplied electrons are consumed when the oxidizer is reduced.

Electrochemical fuel cells can employ a variety of gaseous fuels and oxidants. For example, hydrogen fuel cells employ molecular hydrogen as the fuel and oxygen in air or a carrier gas as the oxidant. In hydrogen fuel cells, hydrogen gas is oxidised and oxygen gas reduced to form water, with an electrical current produced as a by-product of the redox reaction. Electron flow along the electrical connection between the anode and the cathode provides electrical power to load(s) interposed in the circuit with the electrical connection between the anode and the cathode.

In an alkaline fuel cell, hydrogen gas is oxidised and oxygen gas reduced to form water, with an electrical current produced as a by-product of the redox reaction. Hydroxide anions OH⁻ flow through the electrolyte from the cathode to the anode. In an alkaline fuel cell, the following half-reactions take place:

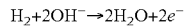  Anode reaction:

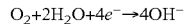  Cathode reaction:

The second of these reactions is known as the oxygen reduction reaction (ORR). Its reverse reaction, resulting in the generation of molecular oxygen, is known as the oxygen evolution reaction (OER).

Hydrogen fuel cells, including alkaline fuel cells, have traditionally used precious metals, such as platinum, as catalysts. However, these materials are expensive, and research has concentrated on providing alternatives with comparable or better performance as fuel cell catalysts but at lower cost.

Considerable effort has focused on the search for active and stable electrocatalysts for both the oxygen reduction reaction (ORR) in low temperature fuel cells (LTFC), and the oxygen evolution reaction (OER) which are more cost effective than those containing precious metals. As an additional challenge, there is an increasing interest in electrocatalysts for reversible low temperature fuel cells (RLTFC, also known as unitized regenerative fuel cells, URFC) because of their potential in distributed energy storage: A RLTFC will require catalysts with simultaneously low overpotentials for both ORR and OER. There is also a requirement for reversible ORR/OER electrocatalysts for efficient metal/air batteries. While the search for such "bi-functional catalysts" continues, the question also remains as to whether a single catalyst, or indeed a single site at such a catalyst, will produce potentials which converge towards the equilibrium potential of +1.23 $V_{RHE}$ for ORR/OER.

Mixed metal oxides having a perovskite structure have been of interest as catalysts. As is known to the person skilled in the art, a perovskite structure generally means a crystal structure of a composition having a general chemical formula $ABX_3$, where A is a first ion, B is a second ion of smaller size than A, and X is an ion that bonds to both. In the perovskite structure, the 'A' ions are therefore larger than the 'B' ions. In the idealized cubic unit cell of such a compound, the type 'A' ions sit at cube corner positions (0, 0, 0) (referred to herein as 'A-sites'), the type 'B' ions sit at body-center position (½, ½, ½) (referred to herein as '13-sites'), and type 'X' ions sit at face centred positions (½, ½, 0). The ideal cubic structure has the B cation in 6-fold coordination, surrounded by an octahedron of anions, and the A cation in 12-fold cuboctahedral coordination.

Transition-metal oxides, and in particular perovskites, have been investigated as alternatives to the precious metal based catalysts as they can exhibit good OER or ORR activities. In the case of manganese oxides, the oxidation state of the bulk appears to strongly influence the ORR activity of the surface, with nano-structured alpha-$Mn_2O_3$ exhibiting high ORR and OER activity. The proximity of the $Mn^{4+}/Mn^{3+}$ redox couple to the ORR/OER equilibrium potential appears to be an important factor in determining the activity of Mn oxide based catalysts.

In Mn based perovskites, the oxidation state of Mn at the B-site can be altered by substitution of cations at the A-site, partial substitution of manganese for a transition-metal in a B-site, or by altering the stoichiometry of oxygen. Such approaches have been observed to increase in the ORR activity.

However, generally it has been found that changes to the composition of the perovskite materials which increase the ORR activity cause a corresponding decrease in the corresponding OER activity. A metal oxide composition which is capable of catalysing both the ORR and OER activities, by exhibiting a low overpotential for both reactions, has not previously been produced in the art, and would therefore be highly desirable.

Demina et al. (*Inorganic Materials* 2005, 41 (7), 736-742) synthesised a number of mixed oxide compositions in the La—Mn—Ni—O system across the entire ternary composition space and developed a structural phase diagram. Although some of those compositions have an overall chemical composition similar to those of the present invention, these are biphasic compositions (specifically, those comprising $La_{1+x}Mn_{1-x-y}Ni_yO_{3-\delta}$ (−0.03≤x≤0, 0.18≤y≤0.4)+$Mn_{3-z}Ni_zO_4$ (0.11≤z≤0.25) and $LaMn_{0.6}Ni_{0.4}O_3$+$Mn_{2.75}Ni_{0.25}O_4$+NiO). Accordingly, the reference does not disclose compounds having a crystalline structure where Ni substitutes for La in the A-sites. Nor does the reference disclose the use of the compounds it discloses as electrocatalysts. Indeed, there is no evidence in Demina et al. that the biphasic materials described therein are capable of any electrochemical behaviour, and certainly not any electrochemical behaviour which would be advantageous as catalysts for the OER and/or ORR reactions.

Sunarso, J.; et al. (*The Journal of Physical Chemistry C* 2012, 116 (9), 5827-5834, describes a number of lanthanum-based perovskite oxides of general formula $LaMO_3$ and $LaNi_{0.5}M_{0.5}O_3$ (M=Ni, Co, Fe, Mn, and Cr). This reference teaches that $LaNi_{0.5}Mn_{0.5}O_3$ exhibits the largest current density and lowest overpotential in the series of $LaNi_{0.5}M_{0.5}O_3$ perovskites. However, the reference does not disclose that Ni or any other metal may substitute for La in the A-sites of the perovskite structure.

SUMMARY OF THE INVENTION

In one aspect, the invention provides a composition consisting essentially of a perovskite crystalline structure, the composition comprising:

ions of a first metal $M^1$ which occupies an A-site of the perovskite crystalline structure;

ions of a second metal $M^2$ which occupies a B-site of the perovskite crystalline structure, $M^2$ having two oxidation states capable of forming a redox couple suitable for reversibly catalyzing an oxygen reduction reaction (ORR) and an oxygen evolution reaction (OER);

ions of a third metal $M^3$, at least a portion of which substitutes for $M^1$ in the A-site of the perovskite crystalline structure, and optionally at least a portion of which also substitutes for $M^2$ in the B-site of the perovskite crystalline structure, at least some of the atoms $M^3$ having a different oxidation state to the atoms $M^1$; and atoms of an element X, which is a chalcogen;

wherein the metal ions $M^1$, $M^2$ and $M^3$ are present in atomic ratios within the ranges (a) or (b):

(a) 25 to 49.9 atomic % $M^1$, 30 to 60 atomic % $M^2$, and 5 to 45 atomic % $M^3$;

(b) 10 to 30 atomic % $M^1$, 50.1 to 60 atomic % $M^2$, and 25 to 45 atomic % $M^3$; each expressed as a percentage of the total metal ions in the composition excluding oxygen;

wherein the presence of the $M^3$ ions causes a change in the oxidation state of some of the $M^2$ ions in the structure, thereby creating the redox couple suitable for reversibly catalyzing the ORR and OER.

According to a further aspect of the invention, there is provided a method of preparing the composition according to any preceding claim, the method comprises providing a source of each component element of the compound, wherein the sources comprise at least a source of atoms $M^1$, a source of atoms $M^2$, a source of atoms $M^3$, and a source of atoms X; and depositing the sources of each element onto a substrate, wherein the component elements from the sources react on the substrate to form the composition consisting essentially of the perovskite crystalline structure containing at least $M^1$, $M^2$, $M^3$ and X.

According to a further aspect of the invention, there is provided use of the composition of the invention as a catalyst, particularly but not exclusively a catalyst which catalyses the oxygen reduction reaction (ORR) and/or the oxygen evolution reaction (OER). In certain cases, there is provided use of the composition of the invention as a catalyst which catalyses the oxygen reduction reaction (ORR) and the oxygen evolution reaction (OER).

According to a further aspect of the invention, there is provided an electrode comprising the composition according to the invention.

According to a further aspect of the invention, there is provided a fuel cell comprising:

an anode;
a cathode; and
an electrolyte;
wherein the anode and/or the cathode includes a catalyst comprising a composition according to the invention.

BRIEF DESCRIPTION OF THE DRAWINGS

FIG. 2A shows the compositional dependence of the (110) 2θ peak position of the perovskite as a function of composition for a composition of general formula $La_{1-x}Mn_yNi_{1-y+x}O_{3-\delta}$ of the compositions of Example 1 of the present invention;

FIG. 2B shows the compositional dependence of the (110) 2θ peak position of the perovskite along the pseudo-binary tie-line (±2 at %) of a composition of general formula $La_xMn_yNi_{1-y+x}O_{3-\delta}$ of the compositions of Example 1 of the present invention; the black line indicates the limits of (110) 2θ peak position between $LaMnO_3$ (Pm-3m) [M. J. Sayagues et al., *Journal of Solid State Chemistry* 2012 188, 11-16] and $LaNiO_3$ (R-3c) [H. Falcon et al., *Journal of Solid State Chemistry* (1997) 133, 397-385];

FIGS. 3A to 3C show, with reference to the compositions of Example 1 of the present invention, the compositional dependence on $La_{1-x}Mn_yNi_{1-y+x}O_{3-\delta}$ electrocatalysts of the charge associated with three redox couples: FIG. 3A showing the $Ni^{2+}/Ni^{3+}$ couple (integrating the cathodic peak over the potential range $1.2<V_{RHE}<1.45$); FIG. 3B showing the $Ni^0/Ni^{2+}$ couple (integrating the cathodic peak over the potential range $0.0<V_{RHE}<0.6$); and FIG. 3C showing the $Mn^{3+}/Mn^{4+}$ couple (integrating the anodic peak over the potential range $0.9<V_{RHE}<1.15$); the data has been extracted from cyclic voltammetry (0.1 M KOH electrolyte, 5 mVs$^{-1}$ scan rate, room temperature) recorded in deoxygenated 0.1 M KOH, on a series of $La_{1-x}Mn_yNi_{1-y+x}O_{3-\delta}$ electrocatalyst thin film libraries; (in each case presented as contour plots averaged over 2 atomic %);

FIG. 4A showing the currents associated with the Oxygen Reduction Reaction (ORR) measured in the cathodic scan, and FIG. 4B showing the Oxygen Evolution Reaction (OER) measured for a selection of the compositions of the $La_{1-x}Mn_yNi_{1-y+x}O_{3-\delta}$ thin film electrocatalyst; measurements have been made at a scan rate of 5 mVs$^{-1}$ in oxygen saturated 0.1M KOH at 25° C.;

FIG. 5A showing this for the Oxygen Reduction Reaction (ORR) calculated from the ignition potential at −20 μA cm$^{-2}$ in the cathodic scan, and FIG. 5B showing this for the Oxygen Evolution Reaction (OER) calculated from the ignition potential at 40 μAcm$^{-2}$; measurements have been made at a scan speed of 5 mVs$^{-1}$ in oxygen saturated 0.1M KOH at 25° C.; (in each case presented as contour plots averaged over 2 atomic %);

FIG. 6A presented as contour plots averaged over 2 atomic %; FIG. 6B being an amalgamation of two single sweep voltammograms of the ORR and OER showing the reactions for selected compositions; measurements have been made at a scan rate of 5 mVs$^{-1}$ in oxygen saturated 0.1M KOH at 25° C.;

FIGS. 10A and 10B show, with reference to the compositions of Example 2 of the present invention, the currents associated with: (FIG. 10A) the Oxygen Reduction Reaction (ORR) measured in the cathodic scan and (FIG. 10B) the Oxygen Evolution Reaction (OER) measured for a selection of the compositions of the $La_{x-z}Ca_{1-x+w}Mn_{y+z+w}O_{3-\delta}$ thin film electrocatalyst; measurements have been made at a scan speed of 5 mVs$^{-1}$ in oxygen saturated 0.1M KOH at 25° C.;

FIGS. 11A and 11B show, with reference to the compositions of Example 2 of the present invention, the compositional dependence of the overpotential measured on $La_{x-z}Ca_{1-x+w}Mn_{y+z+w}O_{3-\delta}$ thin film electrocatalysts using cyclic voltammetry for: (FIG. 11A) the Oxygen Reduction Reaction (ORR) calculated from the ignition potential at −70 μA cm$^{-2}$ in the cathodic scan and (FIG. 11B) The Oxygen Evolution Reaction OER calculated from the ignition potential at 40 μA cm$^{-2}$; measurements have been made at a scan rate of 5 mVs$^{-1}$ in oxygen saturated 0.1M KOH at 25° C.; (in each case presented as contour plots averaged over 2 atomic %);

FIG. 12A presented as contour plots averaged over 2 atomic %; FIG. 12B showing an amalgamation of sweep voltammograms of the ORR and OER showing the reactions at for selected compositions; measurements have been made at a scan rate of 5 mVs$^{-1}$ in oxygen saturated 0.1M KOH at 25° C.;

DETAILED DESCRIPTION

Definitions

Figure 1:
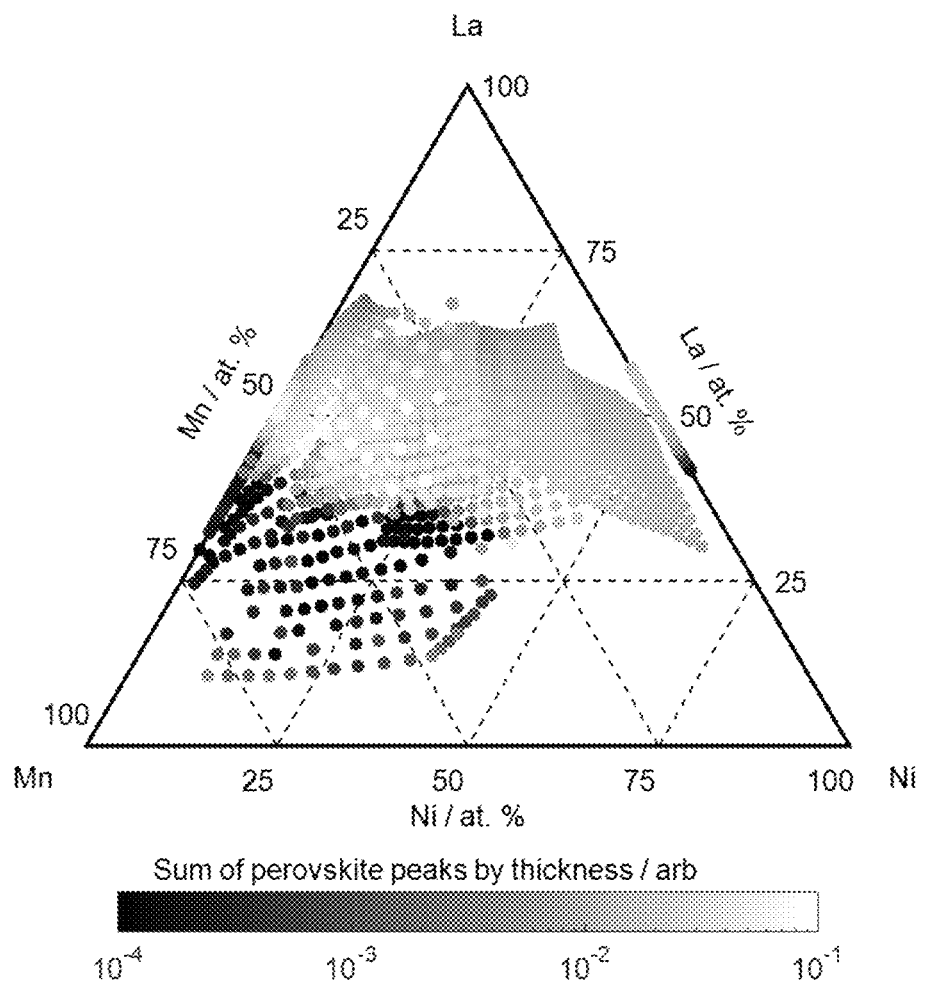
FIG. 1 shows, with reference to the compositions of Example 1 of the present invention, a ternary plot of the sum of the three major perovskite 2θ peaks (32.5°, 40°, and 47°), with a logarithmic scale that shows the presence of perovskite structure of general formula $La_{1-x}Mn_yNi_{1-y+x}O_{3-\delta}$ (the data has been obtained from XRD on 12 individual compositional gradient thin film libraries of $La_{1-x}Mn_yNi_{1-y+x}O_{3-\delta}$ synthesised at 550° C. on Si\SiO substrates)

In this specification the term 'oxygen reduction reaction' or 'ORR' means the half-reaction which results in the reduction of oxygen gas. In an alkaline fuel cell, this takes place according to the following half-reaction:

$O_2 + 2H_2O + 4e^- \rightarrow 4OH^-$ 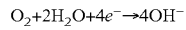

In this specification the term 'oxygen evolution reaction' or 'OER' means the reverse of the above half-reaction which results in the evolution of oxygen gas.

In this specification the term 'element' means an element of the Periodic Table.

In this specification the term 'atom' means an atom of an element of the Periodic Table. The term therefore generally includes the atom when in a charged (i.e. ionic) form and includes forms where the interaction with other atoms is totally ionic and forms where the interaction is partially covalent.

In this specification the term 'ion' means an atom (as defined above) or a molecule comprising a plurality of atoms, when in a charged (ionic) form, and includes forms where the interaction with other atoms in the structure is totally ionic and forms where the interaction is partially covalent. The terms 'monovalent', 'divalent', 'trivalent' and 'tetravalent' when referring to metal ions, mean ions having an oxidation state of +1, +2, +3 and +4 respectively: the term 'oxidation state' taking its normal meaning in the art of the charge assigned to the atom after ionic approximation of its heteronuclear bonds (i.e. on the assumption that all heteronuclear bonding, irrespective of the actual nature of the bonding, is totally ionic).

In this specification the term 'metal' includes both metallic elements and metalloid elements, preferably metallic elements.

In this specification the term 'redox couple' takes its usual meaning in the art of a reducing species and its corresponding oxidizing form. Examples of redox couples include $Mn^{3+}/Mn^{4+}$ and $Fe^{2+}/Fe^{3+}$.

In this specification the terms 'cell' means an apparatus capable of generating electricity through an electrochemical reaction. For the purposes of this specification it is equivalent to the term 'battery'.

Advantages and Surprising Findings

The composition typically consists essentially of a crystalline material, having the perovskite structure $M^1M^2X_3$ described herein wherein the $M^1$ ions occupy A-sites of the perovskite structure and the $M^2$ ions occupy B-sites of the perovskite structure. Surprisingly, it has been found by the present inventors that when ions of a third metal $M^3$, having a different oxidation state to the atoms of the metal $M^1$, are introduced into the perovskite crystalline structure such that at least a portion of the metal atoms $M^3$ substitute for the metal atoms $M^1$ in the A-sites of the perovskite structure, and optionally at least a portion of the metal atoms $M^3$ substitute for the metal atoms $M^2$ in the B-sites of the perovskite structure, this causes the oxidation state of the $M^2$ atoms to change to thereby give rise to a redox couple having a low overpotential for both the oxygen reduction reaction (ORR) and its reverse reaction, the oxygen evolution reaction (OER). This makes the material particularly suitable as a catalyst for use in fuel cells, particularly alkaline fuel cells. This would not have been predicted from the art, as there is generally known to be an anti-correlation between OER and ORR catalytic activity: as the compositional ranges of a particular system change, OER catalytic activity normally decreases as ORR catalytic activity increases and vice versa.

In particular, it has been surprisingly found that, when the metal ions $M^1$, $M^2$ and $M^3$ are present in the atomic ratios defined herein, the redox couple formed by the $M^2$ ions is particularly favourable for both the oxygen reduction reaction (ORR) and the oxygen evolution reaction (OER). While this may be known in the art for perovskite crystalline structures having compositions along the pseudo-binary line (i.e. where all of the A-sites are fully occupied and all of the B-sites are fully occupied, such that the structure has 50% A-site ions and 50% B-site ions, giving an effective 1:1 ratio of A-site ions to B-site ions), it would not have been expected by the skilled person that structures having compositions in the atomic ratios specified herein, away from the pseudo-binary line, would exhibit favourable catalytic properties for both the ORR and the OER.

Composition

The composition comprises, consists essentially of or consists of a perovskite crystalline structure having ions of at least three different metals $M^1$, $M^2$ and $M^3$, together with ions of a chalcogen X, as described in more detail below.

In this specification the term 'perovskite structure' generally means a crystal structure of general chemical formula $M^1M^2X_3$, where $M^1$ is a first metal ion, $M^2$ is a second metal ion of different size to $M^1$, and X is a chalcogen that bonds to both. In the perovskite structure, the $M^1$ ions are larger than the $M^2$ ions. In the idealized cubic unit cell of such a compound, the $M^1$ ions sit at cube corner positions (0, 0, 0) (referred to herein as 'A-sites'), the $M^2$ ions sit at body-center positions (½, ½, ½) (referred to herein as 'B-sites') and chalcogen atoms sit at face centred positions (½, ½, 0). The ideal cubic structure has the $M^2$ cation in 6-fold coordination, surrounded by an octahedron of anions, and the $M^1$ cation in 12-fold cuboctahedral coordination.

Figure 13:
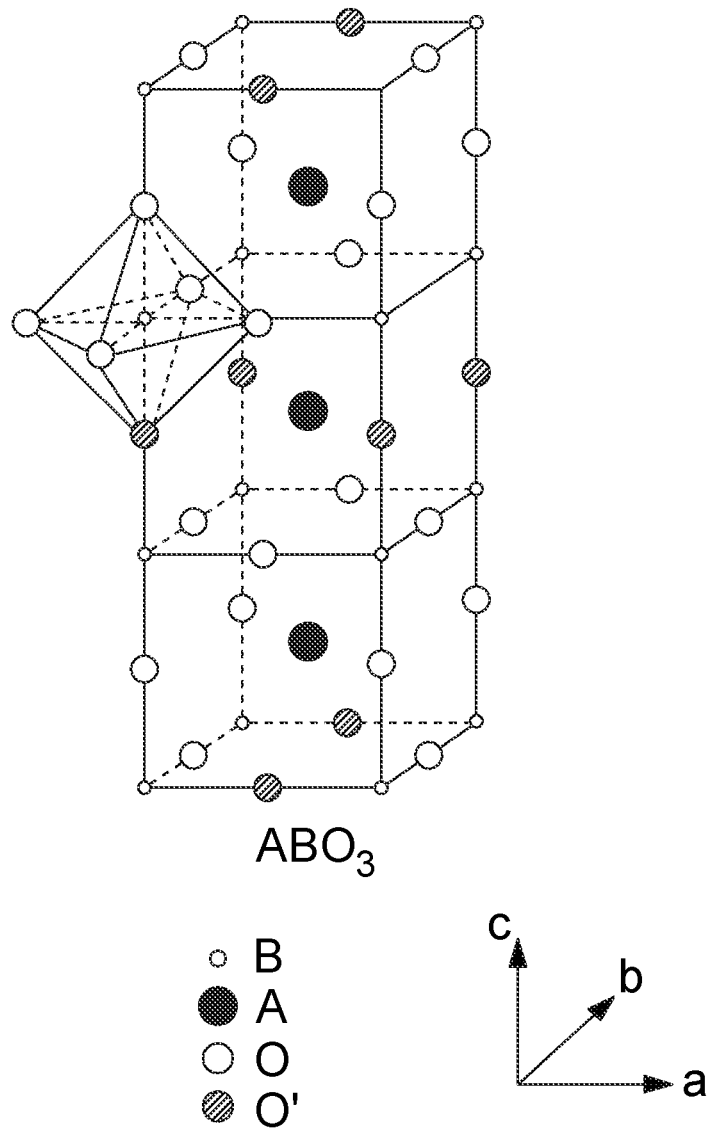
FIG. 13 shows an $ABO_3$ ideal perovskite structure showing oxygen octahedron containing the B ion linked through corners to form a tridimensional cubic lattice (from M. A. Peña and J. L. G. Fierro *Chem. Rev.* 2001, 101, 1981-2017)

An example of an idealised perovskite structure is shown in FIG. 13. In this structure, the smaller B-sites are at the corner of each of the cubes and the larger A-sites are in the body centre of the cube, the relative positions of the ions being the same as described above.

In one embodiment, at least 90% by weight of the total weight of the composition has a perovskite structure. In one embodiment, at least 95% by weight of the total weight of the composition has a perovskite structure. In one embodiment, at least 96% by weight of the total weight of the composition has a perovskite structure. In one embodiment, at least 97% by weight of the total weight of the composition has a perovskite structure. In one embodiment, at least 98% by weight of the total weight of the composition has a perovskite structure. In one embodiment, at least 99% by weight of the total weight of the composition has a perovskite structure. In one embodiment, at least 99.5% by weight of the total weight of the composition has a perovskite structure. In one embodiment, at least 99.7% by weight of the total weight of the composition has a perovskite structure. In one embodiment, at least 99.9% by weight of the total weight of the composition has a perovskite structure.

In this specification, when used to describe atomic sites in a crystalline structure generally, the term 'A-site' means the sites normally occupied by the larger $M^1$ ions in the crystalline structure (and which are typically fully occupied by those atoms in the absence of metal ions $M^3$). The ions $M^1$ may be the same or different. Preferably, all ions $M^1$ are the same.

The ions $M^1$ are larger than the ions $M^2$. The preferred ratio of ionic sizes $M^1$ to $M^2$ is defined by the Goldschmidt tolerance factor t (Goldschmidt, V. M. Skr. Nor. Viedenk.-Akad., KI. I: Mater.-Naturvidensk. KI. 1926, No. 8), defined by the equation:

$$t=(r_{M1}+r_X)/\sqrt{2}(r_{M2}+r_X)$$

wherein $r_{M1}$ is the empirical ionic radius of atom $M^1$ in the oxidation state in which it is present in the structure; $r_{M2}$ is the empirical ionic radius of atom $M^2$ in the oxidation state in which it is present in the structure; and $r_x$ is the empirical ionic radius of atom X in the oxidation state in which it is present in the structure, all of the above being applicable at room temperature. In one embodiment, 0.75<t<1.0. In one embodiment, 0.85<t<1.0. In one embodiment, 0.9<t<1.0. In one embodiment, 0.95<t<1.0. In one embodiment, 0.97<t<1.0. In one embodiment, 0.99<t<1.0. For an ideal perovskite t is unity.

Typical elements which may form the metal ion $M^1$ include alkaline earth metal elements (such as Ca, Sr or Ba), rare earth elements (Sc, Y or a lanthanide, such as La, Pr, Nd, Pm, Sm, Eu, Gd, Tb, Dy, Ho, Er, Tm, Yb or Lu) or p-block elements (such as Ga, In, Tl, Ge, Sn, Pb, As, Sb or Bi).

In one embodiment, the metal ion $M^1$, when present at the A-site of a perovskite structure, does not present relevant electrochemical behaviour at voltages within the range of the OER/ORR (typically between +1.0 V and +1.5 V, preferably between +1.1 V and +1.4 V, more preferably between +1.2 V and +1.3 V, still more preferably between +1.21 V and +1.25 V and most preferably between +1.22 V and +1.24 V).

In one embodiment, $M^1$ is a trivalent metal ion. In one embodiment, $M^1$ is selected from the group consisting of Y, La, Pr, Nd, Pm, Sm, Eu, Gd, Tb, Dy, Ho, Er, Tm, Yb, Lu, Sb and Bi. In one embodiment, $M^1$ is a lanthanide metal ion (i.e. selected from the group consisting of La, Pr, Nd, Pm, Sm, Eu, Gd, Tb, Dy, Ho, Er, Tm, Yb and Lu). Preferably, $M^1$ is La or Gd, more preferably La.

In one embodiment, $M^1$ is a divalent metal ion. In one embodiment, $M^1$ is an alkaline earth metal ion. In one embodiment, $M^1$ is selected from the group consisting of Sr and Ba. In one embodiment, $M^1$ is Pb.

The metal which forms the ion $M^2$ is a different metal from the metal which forms the ions $M^1$. The ions $M^2$, in the oxidation state in which they are present in the crystalline structure have a smaller ionic radius than the ions $M^1$ in the oxidation state in which they are present in the crystalline structure. In this specification, when used to describe ionic sites in a crystalline structure generally the term 'B-site' means the sites occupied by the smaller $M^2$ ions in the crystalline structure. The ions $M^2$ may be the same or different. Preferably, all ions $M^2$ are the same.

In the composition of the present invention, the atom which forms the ions $M^2$ has two oxidation states capable of forming a redox couple suitable for reversibly catalyzing an oxygen reduction reaction (ORR) and an oxygen evolution reaction (OER). The change in oxidation state is caused by the presence in the A-sites of the ions $M^3$ as described below.

In one embodiment, the potential of the redox couple between the two oxidation states of the atom $M^2$ is between +1.0 V and +1.5 V. In one embodiment, the potential of the redox couple between the two oxidation states of the atom $M^2$ is between +1.1 V and +1.4 V. In one embodiment, the potential of the redox couple between the two oxidation states of the atom $M^2$ is between +1.2 V and +1.3 V. In one embodiment, the potential of the redox couple between the two oxidation states of the atom $M^2$ is between +1.21 V and +1.25 V. In one embodiment, the potential of the redox couple between the two oxidation states of the atom $M^2$ is between +1.22 V and +1.24 V. These potentials are measured relative to that of the standard hydrogen electrode (at which the half-reaction follows the equation $2H^+ + 2e^- \rightarrow H_2$) which is assigned the potential of 0 V.

Typically, the potential of this redox couple is measured at a pH of 7 to 14, preferably 10 to 14, more preferably 12 to 14, even more preferably 12.5 to 13.5, and most preferably 12.8 to 13.4.

Typical elements which form the ions $M^2$ include transition metal elements, such as first transition group elements (Ti, V, Cr, Mn, Fe, Co, Ni and Cu) and second transition metal group elements (Zr, Nb, Mo, Tc, Ru, Rh, Pd, Ag).

In one embodiment, $M^2$ is a trivalent metal ion capable of oxidation to a tetravalent oxidation state to form the redox couple. In one embodiment, $M^2$ is Mn.

In one embodiment, $M^2$ is a divalent metal ion capable of oxidation to a trivalent oxidation state to form the redox couple. In one embodiment, $M^2$ is Fe, Co, or Ni.

In one embodiment, $M^2$ is a tetravalent metal ion capable of reduction to a trivalent oxidation state to form the redox couple. In one embodiment, $M^2$ is Ti.

In one embodiment, $M^2$ is a trivalent metal ion capable of reduction to a divalent oxidation state to form the redox couple. In one embodiment, $M^2$ is Fe or Co.

In the present invention the redox couple formed by the two oxidation states of $M^2$ is typically suitable for reversibly catalyzing an oxygen reduction reaction (ORR) and an oxygen evolution reaction (OER). Preferably, such a redox couple will have the potentials (relative to the standard hydrogen electrode) within the ranges specified above, and in particular at the pH ranges listed above. As is well known to the person skilled in the art, a large number of possible redox couples have potentials within this range and are capable of performing this function. Examples of typical redox couples formed by atoms $M^2$ include $Ni^{2+}/Ni^{3+}$, $Mn^{3+}/Mn^{4+}$, $Fe^{2+}/Fe^{3+}$ and $Co^{2+}/Co^{3+}$.

In the compositions of the present invention, at least a portion of ions of the third metal $M^3$ substitutes for $M^1$ in the A-site of the perovskite crystalline structure. In one embodiment, at least 0.1% (as a proportion of the total metal atoms $M^1$ and $M^3$ in the A-sites of the composition) of $M^3$ substitutes for $M^1$ in the A-site of the perovskite crystalline structure. In one embodiment, at least 0.5% (as a proportion of the total metal atoms $M^1$ and $M^3$ in the A-sites of the composition) of $M^3$ substitutes for $M^1$ in the A-site of the perovskite crystalline structure. In one embodiment, at least 1% (as a proportion of the total metal atoms $M^1$ and $M^3$ in the A-sites of the composition) of $M^3$ substitutes for $M^1$ in the A-site of the perovskite crystalline structure. In one embodiment, at least 2% (as a proportion of the total metal atoms $M^1$ and $M^3$ in the A-sites of the composition) of $M^3$ substitutes for $M^1$ in the A-site of the perovskite crystalline structure. In one embodiment, at least 3% (as a proportion of the total metal atoms $M^1$ and $M^3$ in the A-sites of the composition) of $M^3$ substitutes for $M^1$ in the A-site of the perovskite crystalline structure. In one embodiment, at least 5% (as a proportion of the total metal atoms $M^1$ and $M^3$ in the A-sites of the composition) of $M^3$ substitutes for $M^1$ in the A-site of the perovskite crystalline structure. In one embodiment, at least 10% (as a proportion of the total metal atoms $M^1$ and $M^3$ in the A-sites of the composition) of $M^3$ substitutes for $M^1$ in the A-site of the perovskite crystalline structure. In one embodiment, at least 20% (as a proportion of the total metal atoms $M^1$ and $M^3$ in the A-sites of the composition) of $M^3$ substitutes for $M^1$ in the A-site of the perovskite crystalline structure. In one embodiment, at least 30% (as a proportion of the total metal atoms $M^1$ and $M^3$ in the A-sites of the composition) of $M^3$ substitutes for $M^1$ in the A-site of the perovskite crystalline structure. In one embodiment, at least 40% (as a proportion of the total metal atoms $M^1$ and $M^3$ in the A-sites of the composition) of $M^3$ substitutes for $M^1$ in the A-site of the perovskite crystalline structure. In one embodiment, at least 50% (as a proportion of the total metal atoms $M^1$ and $M^3$ in the A-sites of the composition) of $M^3$ substitutes for $M^1$ in the A-site of the perovskite crystalline structure. In one embodiment, at least 60% (as a proportion of the total metal atoms $M^1$ and $M^3$ in the A-sites of the composition) of $M^3$ substitutes for $M^1$ in the A-site of the perovskite crystalline structure. In one embodiment, at least 70% (as a proportion of the total metal atoms $M^1$ and $M^3$ in the A-sites of the composition) of $M^3$ substitutes for $M^1$ in the A-site of the perovskite crystalline structure. In one embodiment, at least 80% (as a proportion of the total metal atoms $M^1$ and $M^3$ in the A-sites of the composition) of $M^3$ substitutes for $M^1$ in the A-site of the perovskite crystalline structure. In one embodiment, at least 90% (as a proportion of the total metal atoms $M^1$ and $M^3$ in the A-sites of the composition) of $M^3$ substitutes for $M^1$ in the A-site of the perovskite crystalline structure. In one embodiment, at least 95% (as a proportion of the total metal atoms $M^1$ and $M^3$ in the a-sites of the composition) of $M^3$ substitutes for $M^1$ in the A-site of the perovskite crystalline structure. In one embodiment, at least 97% (as a proportion of the total metal atoms $M^1$ and $M^3$ in the A-sites of the composition) of $M^3$ substitutes for $M^1$ in the A-site of the perovskite crystalline structure. In one embodiment, at least 99% (as a proportion of the total metal atoms $M^1$ and $M^3$ in the A-sites of the composition) of $M^3$ substitutes for $M^1$ in the A-site of the perovskite crystalline structure.

In one embodiment, from 0.1% to 99.9% (as a proportion of the total metal atoms $M^1$ and $M^3$ in the A-sites of the composition) of $M^3$ substitutes for $M^1$ in the A-site of the perovskite crystalline structure. In one embodiment, from 1% to 99% (as a proportion of the total metal atoms $M^1$ and $M^3$ in the A-sites of the composition) of $M^3$ substitutes for $M^1$ in the A-site of the perovskite crystalline structure. In one embodiment, from 2% to 98% (as a proportion of the total metal atoms $M^1$ and $M^3$ in the A-sites of the composition) of $M^3$ substitutes for $M^1$ in the A-site of the perovskite crystalline structure. In one embodiment, from 3% to 97% (as a proportion of the total metal atoms $M^1$ and $M^3$ in the A-sites of the composition) of $M^3$ substitutes for $M^1$ in the A-site of the perovskite crystalline structure. In one embodiment, from 5% to 95% (as a proportion of the total metal atoms $M^1$ and $M^3$ in the A-sites of the composition) of $M^3$ substitutes for $M^1$ in the A-site of the perovskite crystalline structure. In one embodiment, from 10% to 90% (as a proportion of the total metal atoms $M^1$ and $M^3$ in the A-sites of the composition) of $M^3$ substitutes for $M^1$ in the A-site of the perovskite crystalline structure. In one embodiment, from 15% to 85% (as a proportion of the total metal atoms $M^1$ and $M^3$ in the A-sites of the composition) of $M^3$ substitutes for $M^1$ in the A-site of the perovskite crystalline structure. In one embodiment, from 20% to 80% (as a proportion of the total metal atoms $M^1$ and $M^3$ in the A-sites of the composition) of $M^3$ substitutes for $M^1$ in the A-site of the perovskite crystalline structure. In one embodiment, from 30% to 70% (as a proportion of the total metal atoms $M^1$ and $M^3$ in the A-sites of the composition) of $M^3$ substitutes for $M^1$ in the A-site of the perovskite crystalline structure. In one embodiment, from 40% to 60% (as a proportion of the total metal atoms $M^1$ and $M^3$ in the A-sites of the composition) of $M^3$ substitutes for $M^1$ in the A-site of the perovskite crystalline structure.

In addition to the ions of the third metal $M^3$ which substitute for $M^1$ in the A-site of the perovskite crystalline structure, optionally at least a portion of the ions $M^3$ also substitutes for $M^2$ in the B-site of the perovskite crystalline structure. In one embodiment, at least 0.1% (as a proportion of the total metal atoms $M^2$ and $M^3$ in the B-sites of the composition) of $M^3$ substitutes for $M^2$ in the B-site of the perovskite crystalline structure. In one embodiment, at least 0.5% (as a proportion of the total metal atoms $M^2$ and $M^3$ in the B-sites of the composition) of $M^3$ substitutes for $M^2$ in the B-site of the perovskite crystalline structure. In one embodiment, at least 1% (as a proportion of the total metal atoms $M^2$ and $M^3$ in the B-sites of the composition) of $M^3$ substitutes for $M^2$ in the B-site of the perovskite crystalline structure. In one embodiment, at least 2% (as a proportion of the total metal atoms $M^2$ and $M^3$ in the B-sites of the composition) of $M^3$ substitutes for $M^2$ in the B-site of the perovskite crystalline structure. In one embodiment, at least 3% (as a proportion of the total metal atoms $M^2$ and $M^3$ in the B-sites of the composition) of $M^3$ substitutes for $M^2$ in the B-site of the perovskite crystalline structure. In one embodiment, at least 5% (as a proportion of the total metal atoms $M^2$ and $M^3$ in the B-sites of the composition) of $M^3$ substitutes for $M^2$ in the B-site of the perovskite crystalline structure. In one embodiment, at least 10% (as a proportion of the total metal atoms $M^2$ and $M^3$ in the B-sites of the composition) of $M^3$ substitutes for $M^2$ in the B-site of the perovskite crystalline structure. In one embodiment, at least 20% (as a proportion of the total metal atoms $M^2$ and $M^3$ in the B-sites of the composition) of $M^3$ substitutes for $M^2$ in the B-site of the perovskite crystalline structure. In one embodiment, at least 30% (as a proportion of the total metal atoms $M^2$ and $M^3$ in the B-sites of the composition) of $M^3$ substitutes for $M^2$ in the B-site of the perovskite crystalline structure. In one embodiment, at least 40% (as a proportion of the total metal atoms $M^2$ and $M^3$ in the B-sites of the composition) of $M^3$ substitutes for $M^2$ in the B-site of the perovskite crystalline structure. In one embodiment, at least 50% (as a proportion of the total metal atoms $M^2$ and $M^3$ in the B-sites of the composition) of $M^3$ substitutes for $M^2$ in the B-site of the perovskite crystalline structure. In one embodiment, at least 60% (as a proportion of the total metal atoms $M^2$ and $M^3$ in the B-sites of the composition) of $M^3$ substitutes for $M^2$ in the B-site of the perovskite crystalline structure. In one embodiment, at least 70% (as a proportion of the total metal atoms $M^2$ and $M^3$ in the B-sites of the composition) of $M^3$ substitutes for $M^2$ in the B-site of the perovskite crystalline structure. In one embodiment, at least 80% (as a proportion of the total metal atoms $M^2$ and $M^3$ in the B-sites of the composition) of $M^3$ substitutes for $M^2$ in the B-site of the perovskite crystalline structure. In one embodiment, at least 90% (as a proportion of the total metal atoms $M^2$ and $M^3$ in the B-sites of the composition) of $M^3$ substitutes for $M^2$ in the B-site of the perovskite crystalline structure. In one embodiment, at least 95% (as a proportion of the total metal atoms $M^2$ and $M^3$ in the B-sites of the composition) of $M^3$ substitutes for $M^2$ in the B-site of the perovskite crystalline structure. In one embodiment, at least 97% (as a proportion of the total metal atoms $M^2$ and $M^3$ in the B-sites of the composition) of $M^3$ substitutes for $M^2$ in the B-site of the perovskite crystalline structure. In one embodiment, at least 99% (as a proportion of the total metal atoms $M^2$ and $M^3$ in the B-sites of the composition) of $M^3$ substitutes for $M^2$ in the B-site of the perovskite crystalline structure.

In one embodiment, from 0.1% to 99.9% (as a proportion of the total metal atoms $M^2$ and $M^3$ in the B-sites of the composition) of $M^3$ substitutes for $M^2$ in the B-site of the perovskite crystalline structure. In one embodiment, from 1% to 99% (as a proportion of the total metal atoms $M^2$ and $M^3$ in the B-sites of the composition) of $M^3$ substitutes for $M^2$ in the B-site of the perovskite crystalline structure. In one embodiment, from 2% to 98% (as a proportion of the total metal atoms $M^2$ and $M^3$ in the B-sites of the composition) of $M^3$ substitutes for $M^2$ in the B-site of the perovskite crystalline structure. In one embodiment, from 3% to 97% (as a proportion of the total metal atoms $M^2$ and $M^3$ in the B-sites of the composition) of $M^3$ substitutes for $M^2$ in the B-site of the perovskite crystalline structure. In one embodiment, from 5% to 95% (as a proportion of the total metal atoms $M^2$ and $M^3$ in the B-sites of the composition) of $M^3$ substitutes for $M^2$ in the B-site of the perovskite crystalline structure. In one embodiment, from 10% to 90% (as a proportion of the total metal atoms $M^2$ and $M^3$ in the B-sites of the composition) of $M^3$ substitutes for $M^2$ in the B-site of the perovskite crystalline structure. In one embodiment, from 15% to 85% (as a proportion of the total metal atoms $M^2$ and $M^3$ in the B-sites of the composition) of $M^3$ substitutes for $M^2$ in the B-site of the perovskite crystalline structure. In one embodiment, from 20% to 80% (as a proportion of the total metal atoms $M^2$ and $M^3$ in the B-sites of the composition) of $M^3$ substitutes for $M^2$ in the B-site of the perovskite crystalline structure. In one embodiment, from 30% to 70% (as a proportion of the total metal atoms $M^2$ and $M^3$ in the B-sites of the composition) of $M^3$ substitutes for $M^2$ in the B-site of the perovskite crystalline structure. In one embodiment, from 40% to 60% (as a proportion of the total metal atoms $M^2$ and $M^3$ in the B-sites of the composition) of $M^3$ substitutes for $M^2$ in the B-site of the perovskite crystalline structure.

The third metal which forms the ions $M^3$ is a different metal from the metals which form the ions $M^1$ and $M^2$. The ions $M^3$ may be the same or different. Preferably, all ions $M^3$ are the same. Typically, the ions $M^3$ are in a different oxidation state to the atoms $M^1$. As detailed herein, in the compositions of the present invention, ions of the third atom $M^3$ substitute for ions $M^1$ in at least a portion of the A-sites of the perovskite crystalline structure, and optionally in at least a portion of the B-sites of the perovskite crystalline structure, and cause a change in the oxidation state of the atoms $M^2$, thereby creating a redox couple in the atoms $M^2$ suitable for catalyzing the ORR and OER reactions.

Typical elements which form the ions $M^3$ include alkaline earth metal elements (such as Mg or Ca), transition metal elements, such as first transition group elements (such as Ti, V, Cr, Mn, Fe, Co, Ni and Cu) and second transition metal group elements (such as Y, Zr, Nb, Mo, Tc, Ru, Rh, Pd or Ag). In one embodiment, $M^3$ is selected from the group consisting of Mg, Ca, Ti, V, Cr, Mn, Fe, Co, Ni, Cu, Y, Zr, Nb, Mo, Tc, Ru, Rh or Pd.

In one embodiment, $M^3$ is a divalent metal ion. In one embodiment, $M^3$ is a trivalent metal ion. In one embodiment, $M^3$ is a metal capable of exhibiting both divalent and trivalent oxidation states.

In one embodiment, $M^3$ is selected from the group consisting of Mg, Ca, Fe, Co and Ni. In one embodiment, $M^3$ is selected from the group consisting of Fe, Co and Ni. In one embodiment, $M^3$ is selected from the group consisting of Ca and Ni. In one embodiment, $M^3$ is Ni. In one embodiment, $M^3$ is Ca.

In one embodiment, $M^1$ is a trivalent metal and $M^2$ is a trivalent metal capable of oxidation to a tetravalent oxidation state to form the redox couple. In one embodiment, $M^1$ is a trivalent metal, $M^2$ is a trivalent metal capable of oxidation to a tetravalent oxidation state to form the redox couple, and $M^3$ is a divalent metal.

In one embodiment, $M^1$ is La and $M^2$ is Mn. In one embodiment, $M^1$ is La, $M^2$ is Mn and $M^3$ is selected from the group consisting of Mg, Ca, Fe, Co and Ni. In one embodiment, $M^1$ is La, $M^2$ is Mn and $M^3$ is selected from the group consisting of Ca and Ni. In one embodiment, $M^1$ is La, $M^2$ is Mn and $M^3$ is Ca. In one embodiment, $M^1$ is La, $M^2$ is Mn and $M^3$ is Ni.

The composition also comprises anions of an element X, which is a chalcogen atom (i.e. an atom of an element selected from O, S, Se and Te). Typically, X is O or S, preferably O.

Typically, the element X is present in an amount such that the crystalline structure is electroneutral.

In one embodiment the metal ions $M^1$, $M^2$ and $M^3$ are present in an atomic ratio within the ranges (a): 25 to 49.9 atomic % $M^1$, 30 to 60 atomic % $M^2$, and 5 to 45 atomic % $M^3$, each expressed as a percentage of the total metal ions in the composition excluding oxygen.

In this embodiment, preferably $M^1$ is present in an atomic ratio within the range 27 to 49 atomic %, expressed as a percentage of the total metal ions in the composition excluding oxygen. More preferably, $M^1$ is present in an atomic ratio within the range 30 to 47 atomic %, expressed as a percentage of the total metal ions in the composition excluding oxygen. Even more preferably $M^1$ is present in an atomic ratio within the range 35 to 45 atomic %, expressed as a percentage of the total metal ions in the composition excluding oxygen.

In this embodiment, preferably $M^2$ is present in an atomic ratio within the range 30 to 47 atomic %, expressed as a percentage of the total metal ions in the composition excluding oxygen. More preferably $M^2$ is present in an atomic ratio within the range 35 to 45 atomic %, expressed as a percentage of the total metal ions in the composition excluding oxygen.

In this embodiment, preferably $M^3$ is present in an atomic ratio within the range 10 to 30 atomic %, expressed as a percentage of the total metal ions in the composition excluding oxygen. More preferably $M^3$ is present in an atomic ratio within the range 15 to 25 atomic %, expressed as a percentage of the total metal ions in the composition excluding oxygen.

In one embodiment, the metal ions $M^1$, $M^2$ and $M^3$ are present in atomic ratios within the ranges (a1): 35 to 45 atomic % $M^1$, 30 to 45 atomic % $M^2$, and 15 to 25 atomic % $M^3$; all expressed as a percentage of the total metal ions in the composition excluding oxygen.

In one embodiment the metal ions $M^1$, $M^2$ and $M^3$ are present in an atomic ratio within the ranges (b): 10 to 30 atomic % $M^1$, 50.1 to 60 atomic % $M^2$, and 25 to 45 atomic % $M^3$; each expressed as a percentage of the total metal ions in the composition excluding oxygen.

In this embodiment, preferably $M^1$ is present in an atomic ratio within the range 12 to 27 atomic %, expressed as a percentage of the total metal ions in the composition excluding oxygen. More preferably, $M^1$ is present in an atomic ratio within the range 15 to 25 atomic %, expressed as a percentage of the total metal ions in the composition excluding oxygen.

In this embodiment, preferably $M^2$ is present in an atomic ratio within the range 50.5 to 59 atomic %, expressed as a percentage of the total metal ions in the composition excluding oxygen. More preferably $M^2$ is present in an atomic ratio within the range 51 to 58 atomic %, expressed as a percentage of the total metal ions in the composition excluding oxygen.

In this embodiment, preferably $M^3$ is present in an atomic ratio within the range 27 to 42 atomic %, expressed as a percentage of the total metal ions in the composition excluding oxygen. More preferably $M^3$ is present in an atomic ratio within the range 25 to 35 atomic %, expressed as a percentage of the total metal ions in the composition excluding oxygen.

In one embodiment, the metal ions $M^1$, $M^2$ and $M^3$ are present in atomic ratios within the ranges (b1): 15 to 25 atomic % $M^1$, 51 to 58 atomic % $M^2$, and 25 to 35 atomic % $M^3$; all expressed as a percentage of the total metal ions in the composition excluding oxygen.

In another embodiment, there is provided a composition consisting essentially of a perovskite crystalline structure, having the formula:

$$M^1_x M^2_y M^3_z X_w$$

wherein:

$M^1$ is an ion which occupies an A-site of the perovskite crystalline structure;

$M^2$ is an ion which occupies a B-site of the perovskite crystalline structure, $M^2$ having two oxidation states capable of forming a redox couple suitable for reversibly catalyzing an oxygen reduction reaction (ORR) and an oxygen evolution reaction (OER);

$M^3$ is an ion at least a portion of which substitutes for $M^1$ in an A-site of the perovskite crystalline structure, and optionally at least a portion of which substitutes for $M^2$ in a B site of the perovskite crystalline structure, at least some of the atoms $M^3$ having a different oxidation state to the atoms $M^1$;

X is O or S;

x is greater than 0 and not more than 2;

y is greater than 0 and not more than 2;

z is greater than 0 and not more than 2; and w is greater than 2, but not more than 4.

wherein the ions $M^1$, $M^2$ and $M^3$ are present in the atomic ratios specified herein.

As will be readily understood by the person skilled in the art, the formulae above define the atomic (molar) ratios of each of the constituent metals $M^1$, $M^2$ and $M^3$ relative to each other and to the chalcogen atom X. Thus a formula of $M^1_x M^2_y M^3_z X_w$ is the same as a formula of $M^1_{2x} M^2_{2y} M^3_{2z} X_{2w}$, and so on.

In one embodiment, x ranges from 0.5 to 1.3. In one embodiment, x ranges from 0.7 to 1.1. In one embodiment, x ranges from 0.8 to 0.9. In one embodiment, x ranges from 0.82 to 0.88. In one embodiment, x ranges from 0.84 to 0.86.

In one embodiment, y ranges from 0.5 to 0.9. In one embodiment, y ranges from 0.6 to 0.8. In one embodiment, y ranges from 0.65 to 0.85. In one embodiment, y ranges from 0.68 to 0.72. In one embodiment; y ranges from 0.69 to 0.71. In one embodiment; z ranges from 0.2 to 0.7. In one embodiment, z ranges from 0.3 to 0.6. In one embodiment; z ranges from 0.4 to 0.5. In one embodiment, z ranges from 0.43 to 0.57.

In one embodiment, x ranges from 0.25 to 0.45. In one embodiment, x ranges from 0.28 to 0.32. In one embodiment, x ranges from 0.29 to 0.31.

In one embodiment, y ranges from 1.05 to 1.15. In one embodiment, y ranges from 1.08 to 1.12. In one embodiment, y ranges from 1.09 to 1.11.

In one embodiment, z ranges from 0.55 to 0.65. In one embodiment, z ranges from 0.58 to 0.62. In one embodiment; z ranges from 0.59 to 0.61.

In one embodiment, w ranges from 2.5 to 3.5. In one embodiment, w ranges from 2.7 to 3.3. In one embodiment, w ranges from 2.8 to 3.2. In one embodiment, w ranges from 2.9 to 3.

In one embodiment, x ranges from 0.25 to 0.45; y ranges from 1.05 to 1.15; z ranges from 0.55 to 0.65; and w ranges from 2.8 to 3.2. In one embodiment, x ranges from 0.28 to 0.32; y ranges from 1.08 to 1.12; z ranges from 0.58 to 0.62; and w ranges from 2.8 to 3.2. In one embodiment, x ranges from 0.29 to 0.31; y ranges from 1.09 to 1.11; z ranges from 0.59 to 0.61; and w ranges from 2.8 to 3.2.

In one embodiment, x ranges from 0.8 to 0.9; y ranges from 0.65 to 0.85; z ranges from 0.4 to 0.5; and w ranges from 2.8 to 3.2. In one embodiment, x ranges from 0.82 to 0.88; y ranges from 0.68 to 0.72; z ranges from 0.43 to 0.47; and w ranges from 2.8 to 3.2. In one embodiment, x ranges from 0.84 to 0.86; y ranges from 0.69 to 0.71; z ranges from 0.44 to 0.46; and w ranges from 2.8 to 3.2.

In one embodiment, $M^1$ is La, $M^2$ is Mn, and X is O. In one embodiment, $M^1$ is Sr, $M^2$ is Ti, and X is O. In one embodiment, $M^1$ is Ca, $M^2$ is Ti, and X is O. In one embodiment, $M^1$ is Pb, $M^2$ is Ti, and X is O. In one embodiment, $M^1$ is Bi, $M^2$ is Fe, and X is O. In one embodiment, $M^1$ is La, $M^2$ is Yb, and X is O.

In one embodiment, $M^1$ is La, $M^2$ is Mn, and X is O. In one embodiment, $M^1$ is La, $M^2$ is Mn, $M^3$ is selected from the group consisting of Mg, Ca, Fe, Co and Ni and X is O. In one embodiment, $M^1$ is La, $M^2$ is Mn, $M^3$ is selected from the group consisting of Ca and Ni, and X is O. In one embodiment, $M^1$ is La, $M^2$ is Mn, $M^3$ is Ca and X is O. In one embodiment, $M^1$ is La, $M^2$ is Mn, $M^3$ is Ni and X is O.

In one embodiment, the composition comprises, consists essentially of or consists of a single phase. In contrast to the biphasic materials reported in Demina et al., the compositions comprise all of the ions $M^1$, $M^2$, $M^3$ and X in a single phase. In contrast to these biphasic materials, for which Demina et al. does not provide any evidence of any electrochemical behaviour, the single phase materials of the present invention exhibit favourable electrochemical properties as described herein, in particular efficient catalysis of the OER and ORR reactions. This makes these materials particularly useful for use in cells, especially alkaline fuel cells.

In another embodiment, there is provided a composition of formula:

$$M^1_x M^2_y M^3_z O_w$$

wherein:

the composition consists essentially of a perovskite crystalline structure containing ions of $M^1$, $M^2$ and $M^3$;

$M^1$ is an ion which occupies an A-site of the perovskite crystalline structure;

$M^2$ is an ion which occupies a B-site of the perovskite crystalline structure, $M^2$ having two oxidation states capable of forming a redox couple suitable for reversibly catalyzing an oxygen reduction reaction (ORR) and an oxygen evolution reaction (OER);

$M^3$ is an ion at least a portion of which substitutes for $M^1$ in an A-site of the perovskite crystal structure, and optionally at least a portion of which substitutes for $M^2$ in a B-site of the perovskite crystal structure, at least some of the atoms $M^3$ having a different oxidation state to the atoms $M^1$;

x is greater than 0 and not more than 2;

y is greater than 0 and not more than 2;

z is greater than 0 and not more than 2; and w is greater than 2, but not more than 4;

wherein the presence of the $M^3$ ions causes a change in the oxidation state of some of the $M^2$ ions in the structure, thereby creating the redox couple suitable for reversibly catalyzing the ORR and OER; wherein the ions $M^1$, $M^2$ and $M^3$ are present in the atomic ratios specified herein.

In one embodiment, $M^1$ is La, $M^2$ is Mn, $M^3$ is Ni and the composition comprises 30 to 50 atomic % La, expressed as a percentage of the total metal atoms in the composition excluding oxygen. In one embodiment, $M^1$ is La, $M^2$ is Mn, $M^3$ is Ni and the composition comprises 35 to 45 atomic % La, expressed as a percentage of the total metal atoms in the composition excluding oxygen.

In one embodiment, $M^1$ is La, $M^2$ is Mn, $M^3$ is Ni and the composition comprises 30 to 60 atomic % Mn, expressed as a percentage of the total metal atoms in the composition excluding oxygen. In one embodiment $M^1$ is La, $M^2$ is Mn, $M^3$ is Ni and the composition comprises 40 to 45 atomic % Mn, expressed as a percentage of the total metal atoms in the composition excluding oxygen.

In one embodiment, $M^1$ is La, $M^2$ is Mn, $M^3$ is Ni and the composition comprises 5 to 30 atomic % Ni, expressed as a percentage of the total metal atoms in the composition excluding oxygen. In one embodiment, $M^1$ is La, $M^2$ is Mn, $M^3$ is Ni and the composition comprises 15 to 20 atomic % Ni, expressed as a percentage of the total metal atoms in the composition excluding oxygen.

In one embodiment, $M^1$ is La, $M^2$ is Mn, $M^3$ is Ni and the composition comprises 30 to 50 atomic % La, 30 to 60 atomic % Mn, and 5 to 30 atomic % Ni, all expressed as a percentage of the total metal atoms in the composition excluding oxygen.

In one embodiment, $M^1$ is La, $M^2$ is Mn, $M^3$ is Ni and the composition comprises 35 to 45 atomic % La, 40 to 45 atomic % Mn, and 15 to 20 atomic % Ni, all expressed as a percentage of the total metal atoms in the composition excluding oxygen. It has been surprisingly found that compositions having the above elements in these proportions exhibit a low overpotential in the oxygen reduction reaction (ORR) and simultaneously exhibit a low overpotential in the reverse reaction, the oxygen evolution reaction (OER). Reversible OER/ORR behaviour means that the material is particularly suitable as a catalyst for use in alkaline fuel cells.

In one embodiment, $M^1$ is La, $M^2$ is Mn, $M^3$ is Ni, x ranges from 0.8 to 0.9; y ranges from 0.65 to 0.85; z ranges from 0.4 to 0.5; and w ranges from 2.8 to 3.2. In one embodiment, $M^1$ is La, $M^2$ is Mn, $M^3$ is Ni, x ranges from 0.83 to 0.87; y ranges from 0.68 to 0.72; z ranges from 0.43 to 0.47; and w ranges from 2.8 to 3.2. In one embodiment, $M^1$ is La, $M^2$ is Mn, $M^3$ is Ni, x ranges from 0.84 to 0.86; y ranges from 0.69 to 0.71; z ranges from 0.44 to 0.46; and w ranges from 2.8 to 3.2. It has been surprisingly found that compositions having the above elements in these proportions exhibit a low overpotential in the oxygen reduction reaction (ORR) and simultaneously exhibit a low overpotential in the reverse reaction, the oxygen evolution reaction (OER). This excellent reversible OER/ORR behaviour means that the material is particularly suitable as a catalyst for use in alkaline fuel cells.

In one embodiment, $M^1$ is La, $M^2$ is Mn, $M^3$ is Ca and the composition comprises 10 to 30 atomic % La, expressed as a percentage of the total metal atoms in the composition excluding oxygen. In one embodiment, $M^1$ is La, $M^2$ is Mn, $M^3$ is Ni and the composition comprises 15 to 20 atomic % La, expressed as a percentage of the total metal atoms in the composition excluding oxygen.

In one embodiment, $M^1$ is La, $M^2$ is Mn, $M^3$ is Ca and the composition comprises 40 to 60 atomic % Mn, expressed as a percentage of the total metal atoms in the composition excluding oxygen. In one embodiment, $M^1$ is La, $M^2$ is Mn, $M^3$ is Ca and the composition comprises 50 to 55 atomic % Mn, expressed as a percentage of the total metal atoms in the composition excluding oxygen.

In one embodiment, $M^1$ is La, $M^2$ is Mn, $M^3$ is Ca and the composition comprises 20 to 45 atomic % Ca, expressed as a percentage of the total metal atoms in the composition excluding oxygen. In one embodiment, $M^1$ is La, $M^2$ is Mn, $M^3$ is Ca and the composition comprises 25 to 30 atomic % Ca, expressed as a percentage of the total metal atoms in the composition excluding oxygen.

In one embodiment, $M^1$ is La, $M^2$ is Mn, $M^3$ is Ca and the composition comprises 10 to 30 atomic % La, 40 to 60 atomic % Mn, and 20 to 45 atomic % Ca, all expressed as a percentage of the total metal atoms in the composition excluding oxygen.

In one embodiment, $M^1$ is La, $M^2$ is Mn, $M^3$ is Ca and the composition comprises 15 to 20 atomic % La, 50 to 55 atomic % Mn, and 25 to 30 atomic % Ca, all expressed as a percentage of the total metal atoms in the composition excluding oxygen. It has been surprisingly found that compositions having the above elements in these proportions simultaneously exhibit a low overpotential in the oxygen reduction reaction (ORR) and a low overpotential in the reverse reaction, the oxygen evolution reaction (OER). This means that the material is particularly suitable as a catalyst for use in alkaline fuel cells.

In one embodiment, $M^1$ is La, $M^2$ is Mn, $M^3$ is Ca, x ranges from 0.25 to 0.45; y ranges from 1.05 to 1.15; z ranges from 0.55 to 0.65; and w ranges from 2.8 to 3.2. In one embodiment, $M^1$ is La, $M^2$ is Mn, $M^3$ is Ca, x ranges from 0.28 to 0.32; y ranges from 1.08 to 1.12; z ranges from 0.58 to 0.62; and w ranges from 2.8 to 3.2. In one embodiment, $M^1$ is La, $M^2$ is Mn, $M^3$ is Ca, x ranges from 0.29 to 0.31; y ranges from 1.09 to 1.11; z ranges from 0.59 to 0.61; and w ranges from 2.8 to 3.2. It has been surprisingly found that compositions having the above elements in these proportions exhibit a low overpotential in the oxygen reduction reaction (ORR) and simultaneously exhibit a low overpotential in the reverse reaction, the oxygen evolution reaction (OER). This excellent reversible OER/ORR behaviour means that the material is particularly suitable as a catalyst for use in alkaline fuel cells.

Methods

The compositions of the invention can be prepared by a number of methods well known to those skilled in the art.

Typically, the method comprises providing a source of each component element of the compound, wherein the sources comprise at least a source of atoms which form ions $M^1$, a source of atoms which form ions $M^2$, a source of atoms which form ions $M^3$, and a source of atoms which form ions X; and depositing these onto a substrate, particularly although not exclusively a substrate heated to between about 50° C. and about 800° C. The component elements from the sources react on the substrate to form the composition consisting essentially of the perovskite crystalline structure containing at least $M^1$, $M^2$, $M^3$ and X.

Suitable substrates are well known to the person skilled in the art, and include metals (such as platinum, aluminium, titanium, chromium, iron, zinc, gold, silver, nickel, molybdenum, including alloys thereof, which may include non-metals such as carbon, examples of which include steels such as stainless steel), metal oxides, such as aluminium oxide, particularly conducting metal oxides such as indium tin oxide), silicon, silica, silicon oxide (including doped silicon oxide), aluminosilicate materials, glasses, and ceramic material.

One general method used in accordance with one embodiment of the invention is a physical vapour deposition (PVD) method. According to this method, the crystalline composition is formed from the component elements $M^1$, $M^2$, $M^3$ and X, by providing a vapour source of each component element of the compound and co-depositing the component elements from the vapour sources onto a substrate, typically a heated substrate.

Accordingly, in this embodiment, there is provided a vapour deposition method comprising: providing a vapour source of each component element $M^1$, $M^2$, $M^3$ and X, wherein the vapour sources comprise a source of $M^1$, a source of $M^2$, a source of $M^3$ and a source of X, to deliver a flux of $M^1$, a flux of $M^2$, a flux of $M^3$ and a flux of X; heating a substrate to between substantially 50° C. and 800° C.; depositing the component elements from the sources onto the heated substrate, wherein the component elements react on the substrate to form a crystalline structure of $M^1$, $M^2$, $M^3$ and X, said crystalline structure consisting essentially of a perovskite structure The physical vapour deposition (PVD) method according to the invention typically involves co-depositing the component elements from the vapour sources onto a heated substrate. In one embodiment, the substrate is heated to about 150 to about 700° C. In one embodiment, the substrate is heated to about 200 to about 700° C. In one embodiment, the substrate is heated to about 500 to about 700° C. In one embodiment, the substrate is heated to about 500 to about 600° C. In one embodiment, the substrate is heated to about 530 to about 570° C.

The physical vapor deposition (PVD) method according to the invention is typically carried out at a pressure of $1 \times 10^{-7}$ to $1 \times 10^{-4}$ Torr, preferably $1 \times 10^{-6}$ to $5 \times 10^{-5}$ Torr, and more preferably $5 \times 10^{-6}$ to $2 \times 10^{-5}$ Torr.

A particularly preferred PVD method for forming the crystalline compounds of the invention is described in Guerin, S.; Hayden, B. E., "Physical Vapour Deposition Method for the High-Throughput Synthesis of Solid-State Material Libraries", *Journal of Combinatorial Chemistry* 2006, 8 (1), 66-73.

In the alternative, the method according to the invention may be carried out by sputtering. As is known to the person skilled in the art, sputter deposition is a physical vapour deposition (PVD) method of thin film deposition by sputtering. Sputtering involves ejecting material from one or more targets that is a source of the required element(s) and directing it onto a substrate to enable growth of the required material, typically as a film on the substrate. Typically, the sputtering targets comprise the desired element in the form combined with its respective anion in the desired material (e.g. for a desired material which is a mixed metal oxide, the sputtering targets typically comprise the oxides of each separate component metal).

Therefore, in one embodiment, there is provided a method of producing the composition of the invention, wherein the method is a sputtering deposition method comprising:

providing at least one sputtering target, at least one sputtering target comprising a source of $M^1$, at least one sputtering target comprising a source of $M^2$, at least one sputtering target comprising a source of $M^3$, each sputtering target comprising $M^1$, $M^2$ or $M^3$ combined with X; and sputtering said targets to produce a composition having a crystalline structure comprising $M^1$, $M^2$, $M^3$ and X, said crystalline structure consisting essentially of a perovskite structure.

In the alternative, the method according to the invention may be carried out by chemical vapour deposition (CVD). As is known to the person skilled in the art, chemical vapour deposition comprises providing a vapour source of each component element of the desired substance, wherein the sources comprise one or more precursor compounds containing the required element, and depositing the vaporised elements onto a heated substrate, typically by spraying. The component elements from the sources react on the substrate to form the desired material.

Accordingly, there is further provided a method of producing the composition of the invention) wherein the method is a vapour deposition method comprising: providing a source of each component element of the compound, wherein the sources comprise one or more precursor compounds, at least one precursor compound containing $M^1$, at least one precursor compound containing $M^2$, at least one precursor compound containing $M^3$, and at least one precursor compound containing X;

heating a substrate to between about 200° C. and about 1000° C.;

spraying the precursor compounds onto the heated substrate;

wherein the component elements from the sources react on the substrate to form a crystalline composition containing $M^1$, $M^2$, $M^3$ and X, said crystalline composition consisting essentially of a perovskite structure.

In one embodiment, the substrate is heated to between 250 and 950° C. In one embodiment, the substrate is heated to between 300 and 600° C.

In one embodiment, the CVD method according to the invention is carried out at a pressure of 0.1 to 500 Torr. In one embodiment, the CVD method according to the invention is carried out at a pressure of 1 to 100 Torr.

In one embodiment, the composition of the present invention is formed as a nanoparticle. In this specification, the term 'nanoparticle' takes its normal meaning in the art as a particle having at least one dimension (such as two dimensions, such as three dimensions) between 1 and 100 nm. Suitably, the nanoparticle has at least one dimension (such as two dimensions, such as three dimensions) between 10 and 100 nm. Preferably, the nanoparticle has at least one dimension (such as two dimensions, such as three dimensions) between 10 and 50 nm.

In this embodiment, the nanoparticle is typically supported on a support. Therefore, in another aspect, there is provided a system of the present invention comprising (a) a support; and (b) a composition of the present invention in the form or one or more nanoparticles supported on the support.

In one embodiment, the support comprises a current collecting material, typically a metal, a conducting metal oxide or graphite. In one embodiment, the current collecting material is selected from the group consisting of: platinum, aluminium, titanium, chromium, iron, zinc, gold, silver, nickel, molybdenum, tin oxide, indium tin oxide and stainless steel. In one embodiment, the support is a non-conducting support. In one embodiment, the substrate is selected from the group consisting of: silicon oxide, aluminium oxide, an aluminosilicate material, a glass, and a ceramic material.

Figure 14:
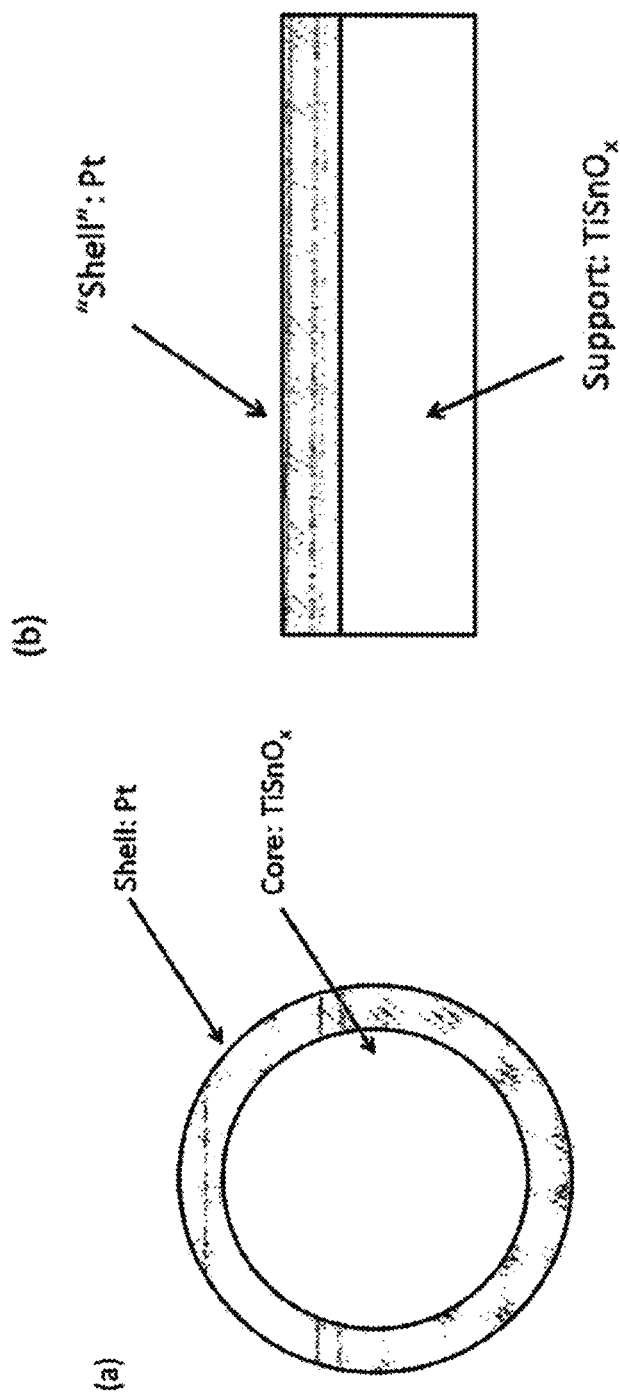
FIG. 14 is a schematic cross-section of a core-shell structure and an equivalent layer structure according to an embodiment of the present invention.

The present invention also provides for "core-shell" materials comprising a core particle of a material; and a shell on the core particle. FIG. 14 shows a schematic cross-section of a core-shell structure. In this regard, the core, the shell, or both may comprise a composition of the present invention.

In one embodiment, the composition of the present invention is formed as a core particle. In one embodiment, the particle has a diameter of 10-50 nm, more preferably 10-25 nm.

In one embodiment, there is provided a core-shell composition comprising (a) a core particle comprising a first composition; and (b) a second, different composition applied as a shell on the core particle, wherein the first composition is a composition of the present invention.

In another embodiment, there is provided a core-shell composition comprising (a) a core particle comprising a first composition; and (b) a second, different composition applied as a shell on the core particle, wherein the second composition is a composition of the present invention.

In one embodiment, the composition which is not the composition of the invention comprises, consists essentially of or consists of a substance capable of catalysing electrochemical reactions, particularly the oxygen reduction reaction (ORR) and/or the oxygen evolution reaction (OER). In one embodiment, this composition comprises, consists essentially of or consists of a metal or conducting metal oxide. In one embodiment, this composition comprises, consists essentially of or consists of platinum or platinum alloy.

In one embodiment, there is provided a core-shell composition comprising (a) a core particle comprising a first composition of the present invention; and (b) a second composition applied as a shell on the core particle, the second composition being a second, different composition of the present invention.

Preferably, the second composition comprises one monolayer (ML) or more of a substance capable of catalysing electrochemical reactions. Even more preferably, the catalyst comprises 1.5 ML or more of this substance.

Preferably, the second composition comprises 20 ML or fewer of a substance capable of catalysing electrochemical reactions, more preferably 15 ML or fewer, most preferably 10 ML or fewer.

Preferably, the second composition is applied to the core particle in a thickness of from 1 to 5 ML; more preferably 1.5 to 5.

In another embodiment, there is provided a method of producing a composition, the method comprising forming a core particle comprising a first composition; and forming a shell comprising at least one monolayer of a second composition on the core particle.

In another embodiment, there is provided a method of producing a core-shell composition, the method comprising forming a core particle comprising a first composition; and forming a shell comprising at least one monolayer of a second composition on the core particle, wherein the first composition is a composition of the present invention.

In another embodiment, there is provided a method of producing a core-shell composition, the method comprising forming a core particle comprising a first composition; and forming a shell comprising at least one monolayer of a second composition on the core particle, wherein the second composition is a composition of the present invention.

In another embodiment, there is provided a method of producing a core-shell composition, the method comprising forming a core particle comprising a first composition; and forming a shell comprising at least one monolayer of a second composition on the core particle, wherein the first composition is a composition of the present invention, and the second composition is a composition of the present invention, the first and second compositions being different.

Applications

The crystalline composition of the present invention is particularly useful as a catalyst for electrochemical reactions, particularly the oxygen reduction reaction (ORR) and/or the oxygen evolution reaction (OER).

Accordingly, in a further aspect the present invention comprises use of the composition of the invention as a catalyst. In one embodiment, the invention comprises use of the composition of the invention as a catalyst for the oxygen reduction reaction (ORR) and/or the oxygen evolution reaction (OER).

In a further aspect the present invention comprises a catalyst comprising the composition of the invention. In one embodiment, the invention comprises use of the composition of the invention as a catalyst for the oxygen reduction reaction (ORR) and/or the oxygen evolution reaction (OER).

In particular, the composition of the invention can be used as a catalyst for use in electrodes, particularly for use in cells such as electrochemical cells and fuel cells.

Accordingly, according to a further aspect the invention further provides an electrode comprising the composition of the invention.

Typically, in the electrode of the invention, the composition is supported on a support. In one embodiment, the composition forms a layer on the support. In one embodiment, the composition forms a film on the support.

Typically, the method involves forming the crystalline composition in the form of a film, typically on a substrate (as defined in more detail below). In one embodiment, the thickness of the film is from 1 nm to 10 µm. In one embodiment, the thickness of the film is from 2 nm to 5 µm. In one embodiment, the thickness of the film is from 5 nm to 2 µm. In one embodiment, the thickness of the film is from 10 nm to 1 µm. In one embodiment, the thickness of the film is from 20 nm to 500 nm. In one embodiment, the thickness of the film is from 50 nm to 200 nm.

Typically, the support is a substrate on which a current collecting material is supported. In one embodiment, the current collecting material is a metal or a conducting metal oxide. In one embodiment, the current collecting material is selected from the group consisting of: platinum, aluminium, titanium, chromium, iron, zinc, gold, silver, nickel, molybdenum, tin oxide, indium tin oxide and stainless steel.

Typically, the substrate is an inert substrate. In one embodiment, the substrate is selected from the group consisting of: silicon, silicon oxide, aluminium oxide, an aluminosilicate material, doped silicon oxide, a glass, a metal, and a ceramic material.

In one embodiment, the substrate is a silicon substrate. In one embodiment, the silicon substrate is covered by one or more passivation layers. In one embodiment, at least one passivation layer comprises silicon dioxide. In one embodiment, at least one further passivation layer comprises silicon nitride.

In one embodiment, an adhesion layer is present between the current collector and substrate. In one embodiment, the adhesion layer is selected from a metal and a metal oxide. In one embodiment, the adhesion layer is selected from the group consisting of: titanium oxide, titanium, zirconium and chromium.

The composition of the present invention may usefully be used in a cell, particularly an electrochemical cell.

Accordingly, to a further aspect of the invention there is provided an electrochemical cell comprising: an electrolyte; an anode; and a cathode; wherein the anode and/or the cathode comprises an electrode according to the present invention.

In one embodiment, the cell is a metal-air cell. As is known to the person skilled in the art, in a metal-air electrochemical cell, a metal is oxidised at the anode and oxygen is reduced at the cathode to induce a current flow. Typical metal-air cells include lithium-air, sodium-air, potassium-air, magnesium-air, calcium-air, aluminium-air, iron-air, zinc-air, aluminium-air, silicon-air, germanium-air and tin-air.

In one embodiment, the cell is a lithium-air cell. As is known to the person skilled in the art, the lithium-air cell is a metal-air electrochemical cell in which lithium is oxidised at the anode and oxygen is reduced at the cathode to induce a current flow.

Fuel Cells

The composition of the present invention may usefully be used in a fuel cell, particularly an alkaline fuel cell.

Therefore, in a further aspect, the invention comprises a fuel cell comprising: an anode;
a cathode;
an electrolyte;
wherein the anode and/or the cathode includes a catalyst comprising a composition according to the present invention.

Typically, the fuel cell further comprises a source of fuel; and/or a source of oxidant.

The fuel may be any fuel commonly used in fuel cells. In one embodiment, the fuel comprises hydrogen. In one embodiment, the fuel comprises an organic compound. Typical examples of organic compounds used in fuel cells include alkanes such as methane and ethane; alcohols such as methanol and ethanol, and carboxylic acids such as formic acid.

In one embodiment, the fuel cell is a hydrogen fuel cell. In hydrogen fuel cells, hydrogen gas is oxidised and oxygen gas reduced to form water, with an electrical current produced as a by-product of the redox reaction. In this embodiment, the fuel cell further comprises a source of hydrogen-containing fuel, and a source of oxygen.

In one embodiment, the fuel cell is an alkaline fuel cell. As with other hydrogen fuel cells, hydrogen gas is oxidised and oxygen gas reduced to form water, with an electrical current produced as a by-product of the redox reaction. In this embodiment, hydroxide anions $OH^-$ flow through the electrolyte from the cathode to the anode.

Preferably, the fuel cell is a regenerative fuel cell, that is, it is capable of functioning both as a fuel cell, which generates electricity from fuel and oxidant, and as an electrolyser, which consumes electricity to generate fuel and oxidant.

EXAMPLES

To understand better the role of A and B-site substitution, and the role of A-site and B-site sub-stoichiometry, in Mn based perovskites, we have investigated both the ORR and OER activities of the $La_{1-x}Mn_yNi_{1-y+x}O_{3-\delta}$ and $La_{x-z}Ca_{1-x+w}Mn_{y+z+w}O_{3-\delta}$ perovskites. The intrinsic activity of continuous thin film catalysts has been measured to exclude any effects of a carbon-based support, which may influence the reaction in the alkali environment. We have applied a combinatorial methodology employing metal evaporative sources combined with an oxygen plasma atom source to produce perovskite structures which can be screened on chip for ORR and OER activity.

General Experimental

Compositional gradient thin film libraries were deposited using a High Throughput Physical Vapour Deposition (HT-PVD) system described in more detail in Guerin, S.; Hayden, B. E., Physical Vapor Deposition Method for the High-Throughput Synthesis of Solid-State Material Libraries. *Journal of Combinatorial Chemistry* 2006, 8 (1), 66-73.

The constituent elements were deposited simultaneously using multiple off-axis Knudsen cell (k-cell) or electron beam (e-beam) sources, each source independently shadowed by a partial "wedge" shutter which controls the flux distribution across the substrate. The position of the wedge shutters controls the compositional region being deposited on the substrate. Lanthanum (Absco 99.95%) was deposited from either a high temperature k-cell or an e-beam, nickel (Testborne 99.99%) was deposited from an e-beam: calcium (Alfa Aesar 99.5%) and manganese (Alfa Aesar 99.95%) were deposited from a k-cell. Oxygen atoms were co-deposited at the substrate by means of a plasma atom source (Oxford Applied Research or Mantis). Simultaneous mixing of the elements provides a low kinetic energy pathway to solid state oxide formation enabling a low temperature route to amorphous and crystalline stoichiometric oxides. Shadow masks were used to define confine oxide growth to discrete fields on the electrochemical chip.

The thin film libraries were deposited onto 35×35 mm Si/SiO substrates (<100> silicon with 100 nm thermal silicon oxide) for composition and X-ray diffraction measurements. For electrochemical measurements, depositions were made on an electrochemical screening chip based on the design described in Guerin, S. et al. *J Phys Chem B* 2006, 110 (29), 14355-62, but with indium tin oxide (ITO) tracks and pads. The ITO conductive layer was chosen for stability and electrochemical inactivity, and the connecting tracks were passivated by a layer of silicon oxide. All depositions were made with the substrate at 550° C. which was sufficient to produce the crystalline perovskite phases.

Elemental composition was measured by Energy-Dispersive X-ray Spectroscopy (EDX) (Tescan Vega 3 LMU SEM incorporating an Oxford Instruments X-Max 50, 50 mm² large area SDD detector). The composition and thickness of the films were derived using LayerProbe software from Oxford Instruments. Crystal structures were determined by X-ray diffraction (XRD) (Bruker D8 diffractometer with GADDS detector and an Incoatec Cu $K_\alpha$ spot X-ray source).

Electrochemical measurements were carried out using a glass cell, instrumentation and software specifically developed for high-throughput electrochemical screening (as described in Guerin, S.; et al. *Journal of Combinatorial Chemistry* 2004, 6 (1), 149-158).

Combining the use of a single channel potentiostat and a multi-channel current follower, fast sequential monitoring of the electrode currents is achieved. The electrochemical measurements were performed in a three-compartment glass cell, especially designed to accommodate the high throughput array. A reference electrode (Hg/HgO, Sentek) was mounted in a Luggin capillary with a tip situated a few millimetres away from the electrochemical array. The counter electrode (a platinum mesh of area~4 cm² and pitch 0.5 mm) was separated from the array under test by a glass sinter. All experiments were conducted in 300 ml of 0.1 M KOH (>99%, Sigma-Aldrich) solution the solution was either used saturated by oxygen or deoxygenated using argon bubbled through the cell.

Example 1—LaMnNiO Compositions

Figure 15:
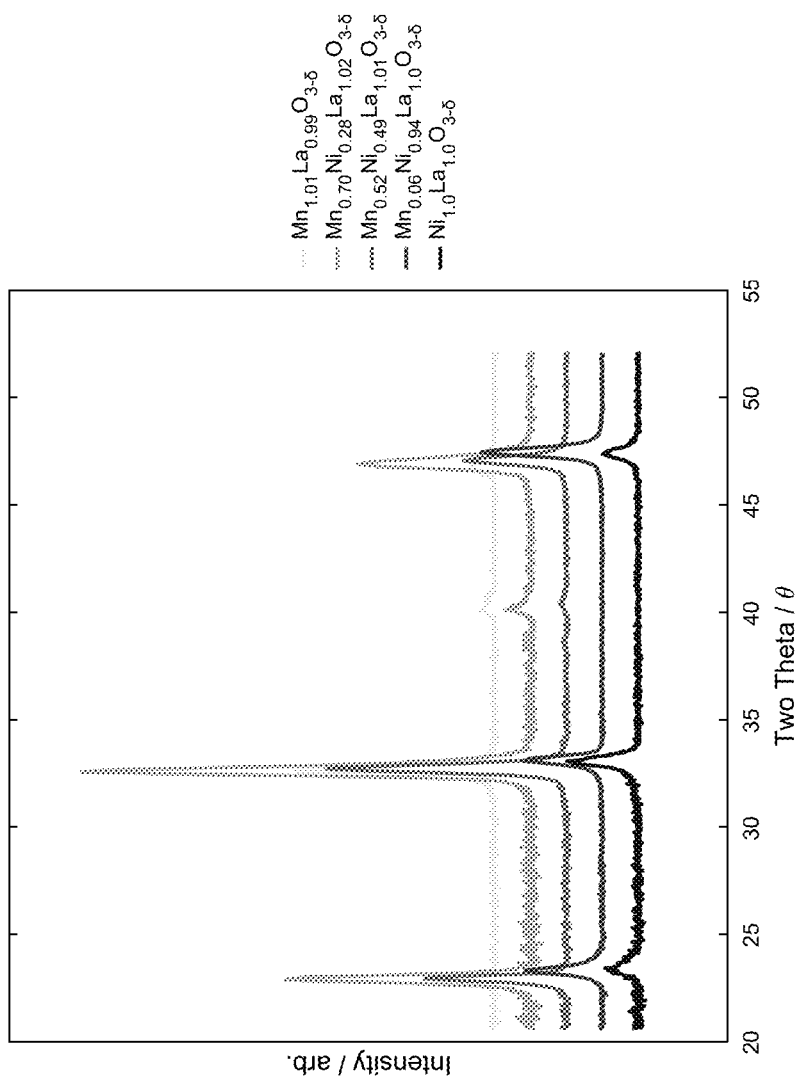
FIG. 15 shows XRD patterns along the pseudo-binary line of a composition of the formula $La_{1-x}Mn_yNi_{1-y+x}O_{3-\delta}$ according to Example 1 of the present invention, indicating that the perovskite is synthesised exclusively at all compositions and characterised by the four Bragg peaks (100), (110), (111) and (200); the data has been obtained from XRD of $La_{1-x}Mn_yNi_{1-y+x}O_{3-\delta}$ catalysts synthesised on Si\SiO substrates.

X-ray diffraction patterns were recorded (2θ values between 21° and)52° on both Si/SiO and electrochemical substrates: The structure for similar compositions was found to be the same irrespective of the substrate. XRD patterns were collected with 2θ values between 21° and 52°, within this range only 6 clearly defined peaks were found. A series of XRD measurements taken along the pseudo-binary line indicate that the perovskite is synthesised exclusively at all compositions and characterised by the four Bragg peaks (100), (110), (111) and (200) (FIG. 15). We do not observe any of the other phases observed in Demina et al. (cited above). Bragg peaks associated with NiO and $MnO_2$ phases are only observed at compositions with less than 30 at. % La, well away from the pseudo-binary line.

FIG. 1 is a logarithmic plot of the sum of the three major perovskite peak intensities (110), (111) and (200) peaks at $2\theta=32.5°$, 40° and 47° respectively, and shows the compositional regions dominated by the perovskite structure. The sum of the three peaks are chosen in order to overcome the substrate induced orientation effects observed with compositional change, and which influence the relative peak intensities.

It is evident that the $La_{1-x}Mn_yNi_{1-y+x}O_{3-\delta}$ perovskites can accommodate a wide range of Mn/La sub-stoichiometry. FIG. 2 is a plot of the $2\theta$ position of the (110) Bragg peak of the perovskite as a function of composition in a ternary plot (FIG. 2A), and as a function of Ni substitution along the pseudo-binary line of $La_{1-x}Mn_yNi_{1-y+x}O_{3-\delta}$ (FIG. 2B). Along the pseudo-binary composition line there is a linear dependence of the (110) $2\theta$ position which correspond to a gradual change from the cubic $LaMnO_3$ (Pm-3m) to the rhombohedral $LaNiO_3$ (R-3c) lattice: The solid line represents a linear dependence between the two structures (H. Falcon et al. *Journal of Solid State Chemistry* 1997, 133, 7; Sayagués, M. J. et al. *Journal of Solid State Chemistry* 2012, 188, 11-16). For compositions below ca. 10% Ni, however, there is a large scatter in the data towards higher $2\theta$ values. There is also a range of $2\theta$ values obtained for the cubic $LaMnO_3$ (Pm-3m) which corresponds to a smaller lattice dimension that would be expected (Sayagués, M. J. et al. above). We suggest that this is a result of $La^{3+}$ substitution by $Mn^{2+}$ at the A-site. Note that this predominates at even slightly La poor compositions in $LaMnO_3$ (FIG. 2A).

Figure 16:
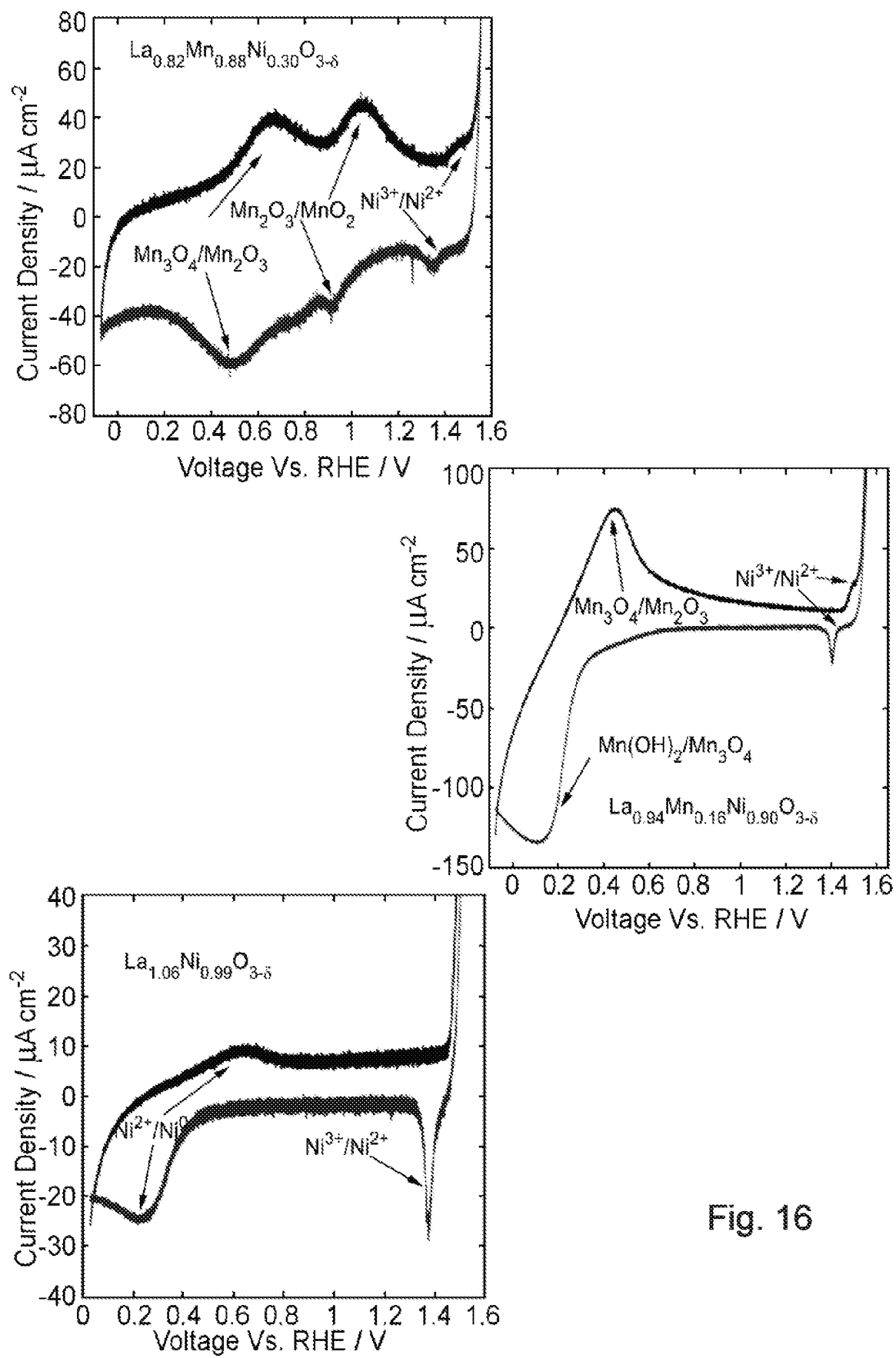
FIG. 16 shows selected cyclic voltammograms (5 mVs$^{-1}$ scan rate, room temperature) recorded in deoxygenated 0.1 M KOH at various compositions of the $La_{1-x}Mn_yNi_{1-y+x}O_{3-\delta}$ thin film electrocatalysts according to Example 1 of the present invention, showing the most prominent redox couples in the system.

As described below, it is this compositional region according to the present invention in which both the $Mn^{3+}/Mn^{4+}$ redox is evident and the perovskites exhibit the most reversible ORR/OER activity. In the absence of dissolved oxygen, cyclic voltammetry (0.1 M KOH electrolyte, 5 $mVs^{-1}$ scan rate and room temperature) was used to identify the main redox couples associated with the $La_{1-x}Mn_yNi_{1-y+x}O_{3-\delta}$ perovskites. Some examples of these are shown in FIG. 16 obtained at several compositions. Three of the redox couples can be ascribed to the $Ni^{2+}/Ni^{3+}$ couple (Singh, R. N.; et al. *Journal of Applied Electrochemistry* 1994, 24 (2), 149-156), $Ni^0/Ni^{2+}$ couple (Hall, D. S. et al. *Journal of the Electrochemical Society* 2013, 160 (3), F235-F243) and the $Mn^{3+}/Mn^{4+}$ couple (Krishnan, S.; et al. *J. Phys. Chem. C* 2016, 120 (39), 22126-22133) centred at $1.45V_{RHE}$, $0.4V_{RHE}$ and $1.0V_{RHE}$ respectively. The two pairs of Ni redox peaks were observed to have the largest integrated charge at high nickel concentrations in $La_{1-x}Mn_yNi_{1-y+x}O_{3-\delta}$, and in the $LaNiO_3$ binary. The compositional dependence of the charge associated with the $Ni^{2+}/Ni^{3+}$ couple centred at $1.45V_{RHE}$ (manifested as sharp anodic and cathodic peaks separated by 100 mV) was assessed by integrating the cathodic peak over the potential range $1.2<V_{RHE}<1.45$ and is shown in FIG. 3A. The highest charge for this couple is identified in the $LaNiO_3$ binary. There is also a region of $Ni^{2+}/Ni^{3+}$ redox activity, albeit with a much lower charge, in perovskites with lower Ni compositions, at La A-site sub-stoichiometric compositions. This corresponds to the same regions of composition which exhibited a smaller than expected lattice parameter in the diffraction (FIG. 2A) which we associated with $Mn^{2+}$ or $Ni^{2+}$ at the A-site: The appearance of the $Ni^{2+}/Ni^{3+}$ redox in this composition region suggests that there is perhaps some $Ni^{2+}$ in the A-site. The compositional dependence of the charge associated with the $Ni^0/Ni^{2+}$ couple centred at $0.4V_{RHE}$ (manifested as broad anodic and cathodic peaks separated by ca. 400 mV) was assessed by integrating the cathodic peak over the potential range $0.0<V_{RHE}<0.6$ and is shown in FIG. 3B. The highest integrated charge is observed along the pseudo-binary composition line, increasing with the Ni content of the perovskite, but is reduced again for $LaNiO_3$.

The compositional dependence of the charge associated with the $Mn^{3+}/Mn^{4+}$ couple centred at $1.0V_{RHE}$ (manifested as broad anodic and cathodic peaks separated by 200 mV) was assessed by integrating the anodic peak over the potential range $0.9<V_{RHE}<1.15$ and is shown in FIG. 3C. It is observed with the highest charge for perovskites with a lower Ni content, where $y>0.25$ in $La_{1-x}Mn_yNi_{1-y+x}O_{3-\delta}$. The compositional region where it is observed, however, is exclusively for compositions with La A-site sub-stoichiometry (FIG. 3C): The maximum in the $Mn^{3+}/Mn^{4+}$ charge density for the anodic sweep is observed for $La_{0.85}Mn_{0.7}Ni_{0.45}O_{3-\delta}$. The apparent substitution of $La^{3+}$ at the A-site by what we believe is likely to be mainly $Ni^{2+}$ is apparently directly correlated with the appearance of the $Mn^{3+}/Mn^{4+}$ redox couple. We suggest that it is the multivalent Mn cation environment created by a divalent ion substitution ($Ni^{2+}$ at the A-site creating a $Mn^{4+}$ environment at the B-site).

Figure 4A:
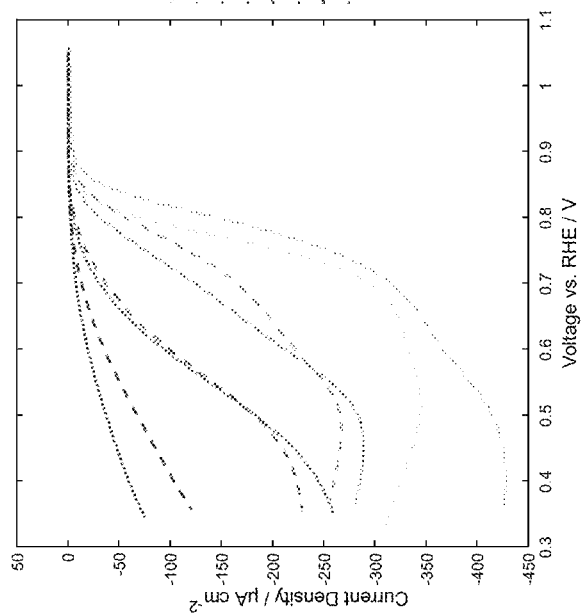
Figure 5B:
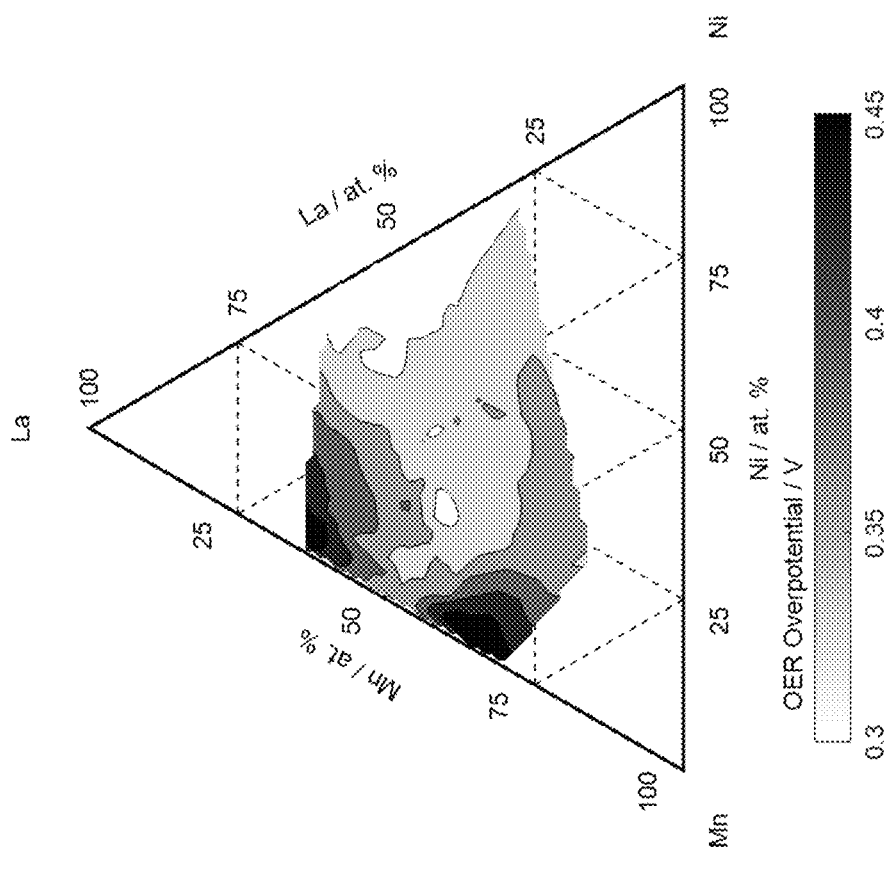
FIGS. 5A and 5B show, with reference to the compositions of Example 1 of the present invention, the compositional dependence of the overpotential measured on $La_{1-x}Mn_yNi_{1-y+x}O_{3-\delta}$ thin film electrocatalysts using cyclic voltammetry.
Figure 5A:
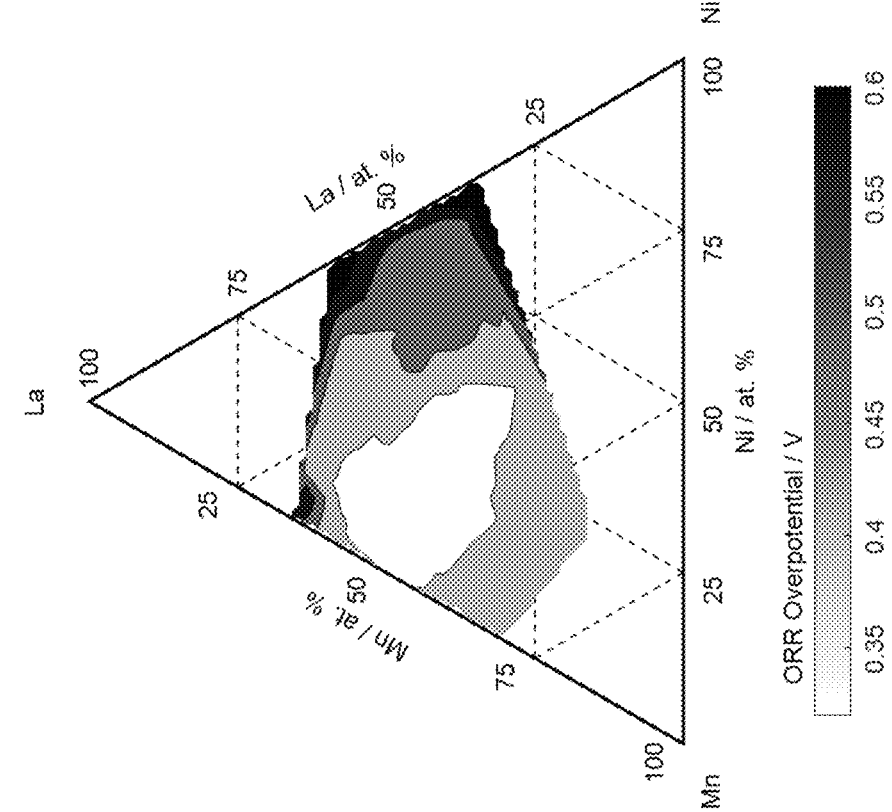

The oxygen reduction reaction (ORR) and oxygen evolution reaction (OER) were measured on the catalyst libraries using cyclic voltammetry. Examples of ORR activities in cathodic sweeps of a series of catalysts with pseudo-binary compositions measured in oxygen saturated electrolyte are shown in FIG. 4A. The ORR activity of $LaNiO_3$ is seen to be very poor, and substitution with Mn increases activity, with the ignition potential ($-20$ $\mu A$ $cm^{-2}$) moving to higher values, and the reduction currents increase more steeply. The best performing ORR catalyst are observed for $LaMn_{0.45}Ni_{0.05}O_{3-\delta}$, and ORR activity drops at lower Ni content. The use of planar electrodes without hydrodynamic flow results in the current being mass transfer limited above a small overpotential. Consequently, ignition potential is used to define the capability of the materials as catalysts: Additionally, to aid interpretation of the results, the ignition potentials are reported as an overpotential with respect to the reversible oxygen potential of 1.23 V in FIG. 5A over the compositions investigated. This clearly shows that the compositions of highest ORR activity are for $LaMnO_3$ and increase further for a range of A-site La sub-stoichiometric compositions of $LaMn_{0.45}Ni_{0.05}O_{3-\delta}$.

Figure 4B:
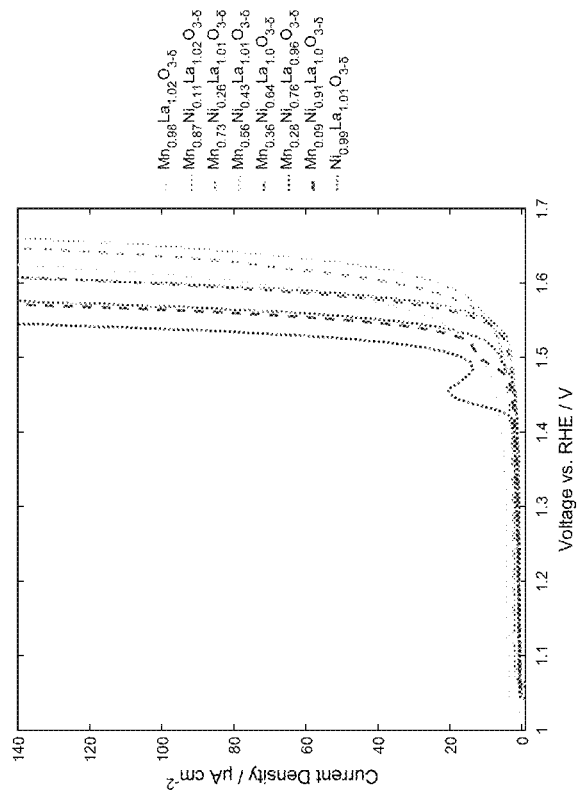
FIGS. 4A and 4B show, with reference to the compositions of Example 1 of the present invention.

Examples of OER activities in anodic sweeps of a series of catalysts with pseudo-binary compositions are shown in FIG. 4B. The OER activity is greatest for Ni rich compositions in $La_{1-x}Mn_yNi_{1-y+x}O_{3-\delta}$, with the lowest activity for compositions at low nickel substitution, it should be noted that the addition of manganese generally has a negative effect on the OER activity. However, as in the case of the ORR reaction, the compositional dependence of the OER reaction is complex. The overpotential for the OER reaction based on the ignition potential (40 $\mu A$ $cm^{-2}$) is plotted as a function of composition for the catalysts investigated in FIG. 5B. The OER activity along the pseudo-binary compositions of $La_{1-x}Mn_yNi_{1-y+x}O_{3-\delta}$ decrease with decreasing Ni content, although increase again slightly for $LaMnO_3$.

The compositional dependence of the ORR and OER activities along the pseudo-binary compositions $La_{1-x}M$-

$n_yNi_{1-y+x}O_{3-\delta}$ highlight that there is, in general, an anti-correlation in the activities of the catalysts: Overpotentials for OER are lowest for Ni rich compositions, and overpotentials for ORR are lowest for Mn rich compositions. It is also clear, by comparison with the main redox activities of Ni and Mn, shown in FIG. 3, that there is no direct correlation of ORR or OER activity with the redox processes identified.

Figures 6A, 6B:
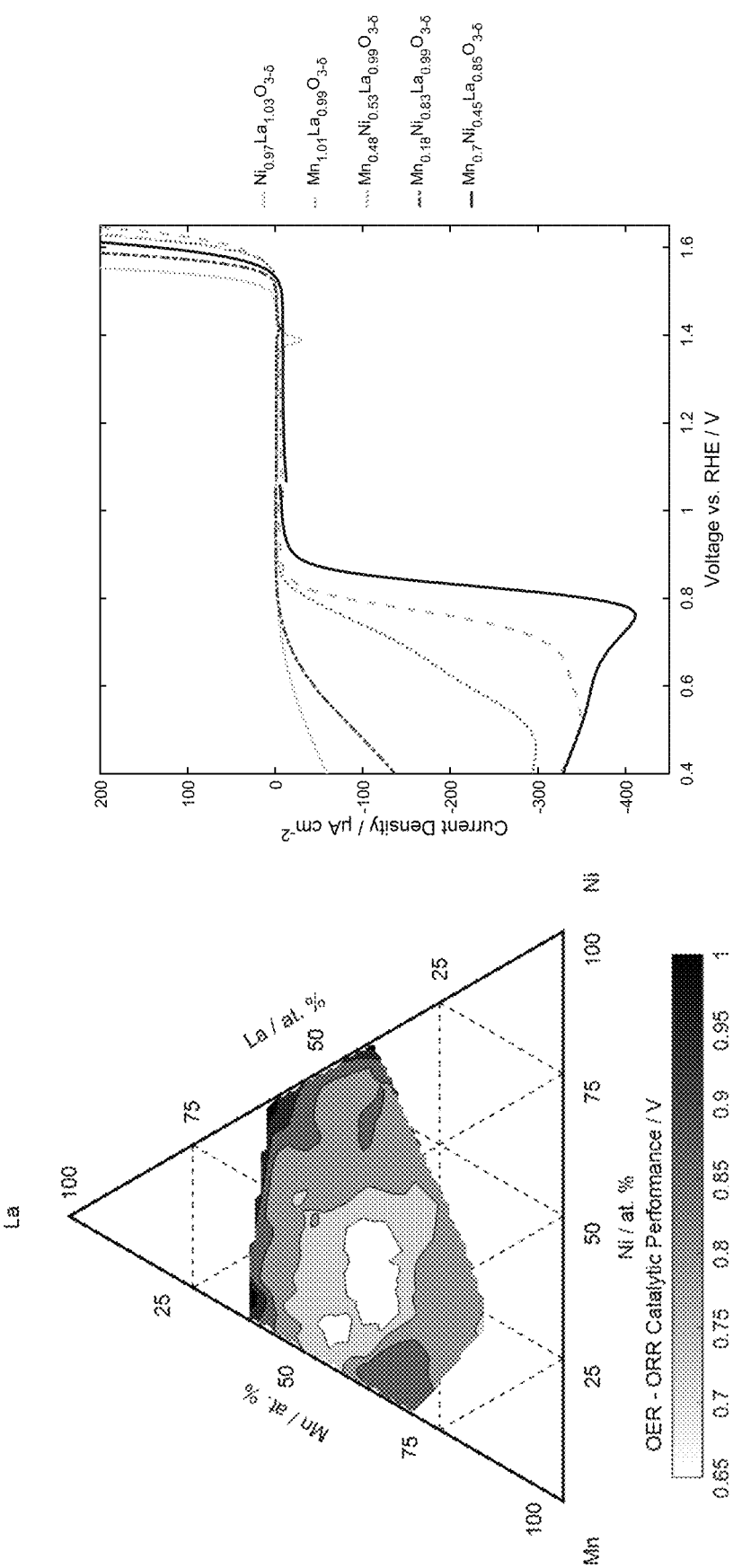
FIGS. 6A and 6B show, with reference to the compositions of Example 1 of the present invention, the compositional dependence of the reversibility of the ORR/OER on $La_{1-x}Mn_yNi_{1-y+x}O_{3-\delta}$ thin film electrocatalysts expressed as the difference between the ORR and OER overpotentials (shown in FIG. 5)

There is, however, a region of compositional space according to the present invention that evidently does not show this anti-correlation in the ORR and OER activities (FIG. 5). Catalysts which exhibit both ORR and OER activities are found for a region of A-site deficient compositions of $La_{1-x}Mn_yNi_{1-y+x}O_{3-\delta}$. These are for compositions with Ni contents below 50 at. %. In order to clearly identify compositions that exhibit both good OER and ORR activities, i.e. the catalysts exhibiting the most reversible OER/ORR behaviour, FIG. 6A shows the compositional dependence of the difference in the ORR and OER overpotentials for the catalysts investigated. The most active reversible electrocatalyst corresponds to compositions around $La_{0.85}Mn_{0.7}Ni_{0.45}O_{3-\delta}$.

FIG. 6B provides examples of the convergence of the ORR and OER overpotentials towards equilibrium. The strongest performing catalyst has the lowest ORR over potential, yet unlike the other voltammetry taken from the pseudo-binary tie-line, there is not a correlating poor OER over potential, resulting in a reversible catalyst.

Striking is the correlation between catalyst compositions which exhibit the most reversible OER/ORR activities (FIG. 6A), and those which exhibit the highest charge associated with the $Mn^{3+}/Mn^{4+}$ redox activities (FIG. 3C). There is evidently a role that the $Mn^{3+}/Mn^{4+}$ couple plays in catalysing both the ORR and OER reactions simultaneously. The reaction sites that support either the ORR or OER reaction along the pseudo-binary compositions of $La_{1-x}Mn_y$ $Ni_{1-y+x}O_{3-\delta}$ (but not both reactions simultaneously) are evidently not the same site associated with the $Mn^{3+}/Mn^{4+}$ which is not observed for these stoichiometries (FIG. 3C).

The association of the $Mn^{3+}/Mn^{4+}$ redox couple with ORR activity is consistent with the observation that the oxidation state on manganese oxides which can result in this couple, and increase ORR activity. The uniqueness of the ability of the $Mn^{3+}/Mn^{4+}$ to also sustain reversible ORR/OER is also consistent with the arguments that it is OH adsorbed at the $Mn^{3+}$ site which is active in ORR, and O adsorbed at $Mn^{4+}$ for the OER activity. It will therefore be the proximity of the $Mn^{3+}/Mn^{4+}$ to the ORR/OER equilibrium potential together with the reversibility of the surface redox which will determine the ultimate reversibility of this reaction at such a bifunctional site.

The explanation for the appearance of the $Mn^{3+}/Mn^{4+}$ redox couple and the concomitant ORR/OER reversible activity at an A-site sub-stoichiometry compositions in $La_{1-x}Mn_yNi_{1-y+x}O_{3-\delta}$ can be explained for this B-site substituted perovskite if one assumes that $Ni^{3+}$ can not only be incorporated at the B-site, but can be incorporated as $Ni^{2+}$ at the A-site (Krishnan et al. above). This is equivalent to the classical divalent substitution of the La A-site which is known to achieve charge balance by inducing similar concentrations of $Mn^{4+}$ (Zener, C., *Physical Review* 1951, 82 (3), 3). It is apparently the creation of $Mn^{4+}$ in addition to $Mn^{3+}$ in a mixed valence system that is important in introducing the $Mn^{3+}/Mn^{4+}$ redox couple. This model is also consistent with the observation that the optimum catalyst has a composition around $La_{0.85}Mn_{0.7}Ni_{0.45}O_{3-\delta}$:

Example 2—LaMnCaO Compositions

In order to test the thesis that A-site sub-stoichiometry of Mn based perovskites can lead to the appearance of the $Mn^{3+}/Mn^{4+}$ redox couple, and a concomitant increase in the ORR/OER reversible activity, we have also investigated the $La_{x-z}Ca_{1-x+w}Mn_{y+z+w}O_{3-\delta}$ perovskites. Without wishing to be bound by theory, it is thought that the inclusion of Ca should result in a direct substitution of the La A-site by the divalent cation.

Figure 17:
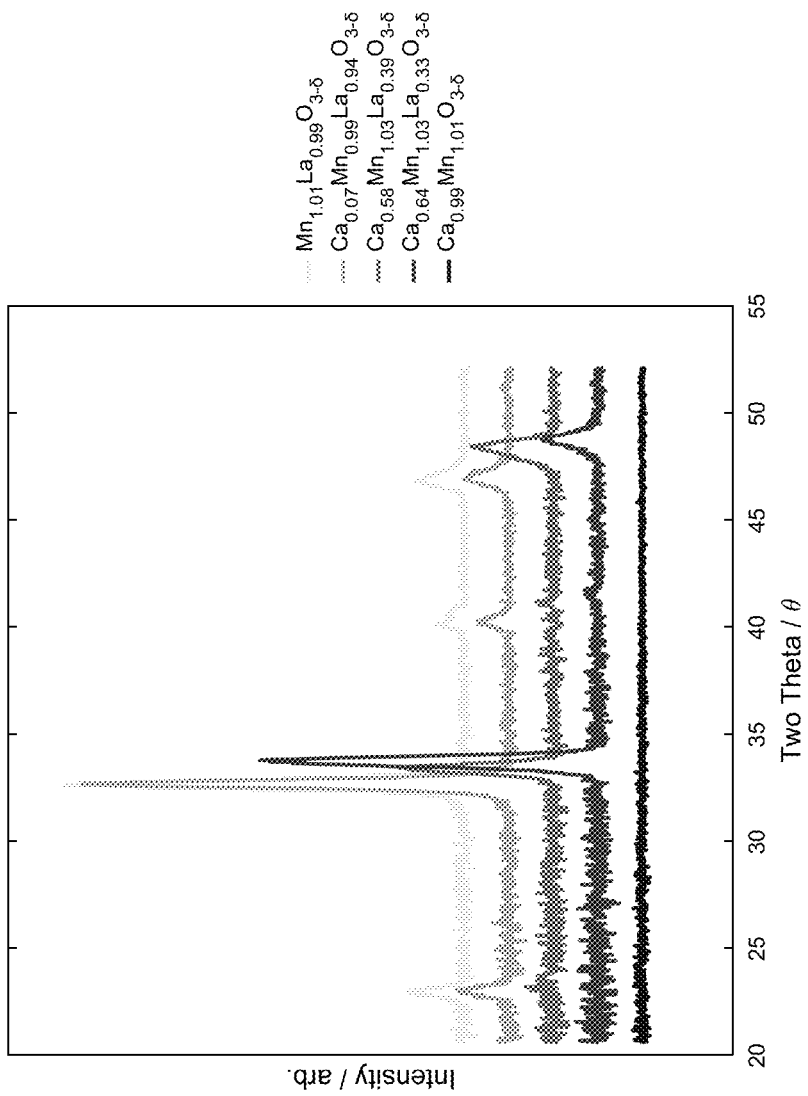
FIG. 17 shows XRD patterns along the pseudo-binary line of $La_{x-z}Ca_{1-x+w}Mn_{y+z+w}O_{3-\delta}$ according to Example 2 of the present invention, indicate that the perovskite is synthesised exclusively at all compositions and characterised by the four Bragg peaks (100), (110), (111) and (200); the data has been obtained from XRD of $La_{x-z}Ca_{1-x+w}Mn_{y+z+w}O_{3-\delta}$ catalysts synthesised on Si\SiO substrates.

A series of the $La_{x-z}Ca_{1-x+w}Mn_{y+z+w}O_{3-\delta}$ perovskite libraries were synthesised, and characterised by X-ray diffraction on both Si\SiO and electrochemical substrates for the $La_{x-z}Ca_{1-x+w}Mn_{y+z+w}O_{3-\delta}$. The XRD patterns were collected with $2\theta$ values between 21° and 52°: within this range only 4 clearly defined peaks were found (FIG. 17) at 23°, 32.5°, 40° and 47° corresponding to the orthorhombic perovskite (Pnma) Bragg peaks (100), (110), (111) and (200) (P. G. Radaelli, et al.; *Physical Review B* 1997, 55 (5), 9).

Figure 7:
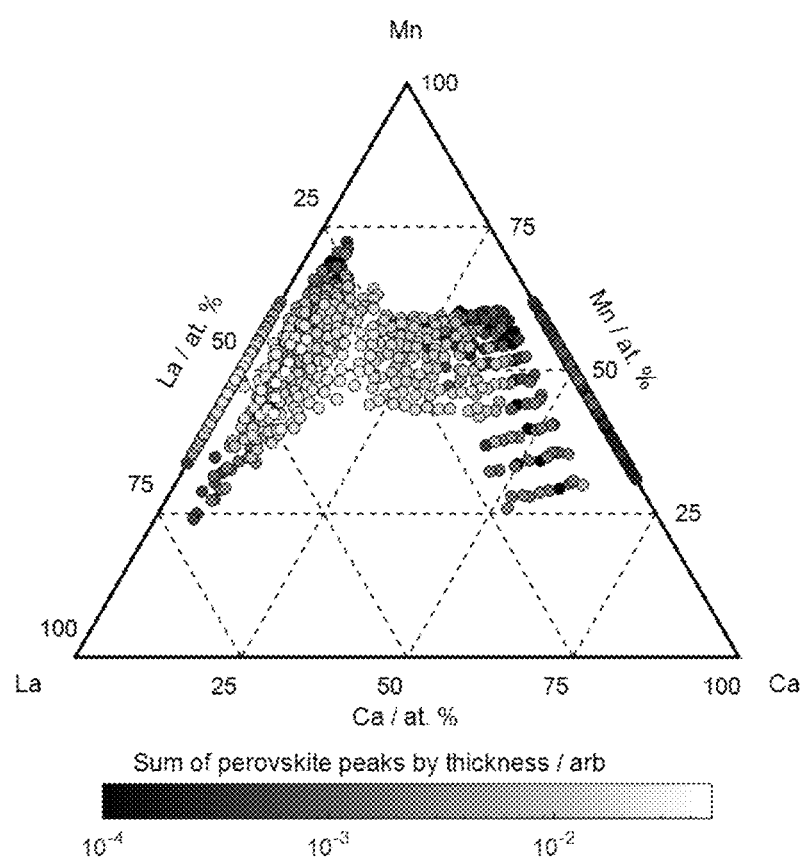
FIG. 7 shows, with reference to the compositions of Example 2 of the present invention, a ternary plot of the sum of the three major perovskite 2θ peaks (32.5°, 40°, and 47°) with a logarithmic scale that shows the presence of perovskite structure of $La_{x-z}Ca_{1-x+w}Mn_{y+z+w}O_{3-\delta}$; the data has been obtained from XRD on 9 individual compositional gradient thin film libraries of $La_{x-z}Ca_{1-x+w}Mn_{y+z+w}O_{3-\delta}$ synthesised at 550° C. on the ITO of the electrochemical array substrate.
Figure 8B:
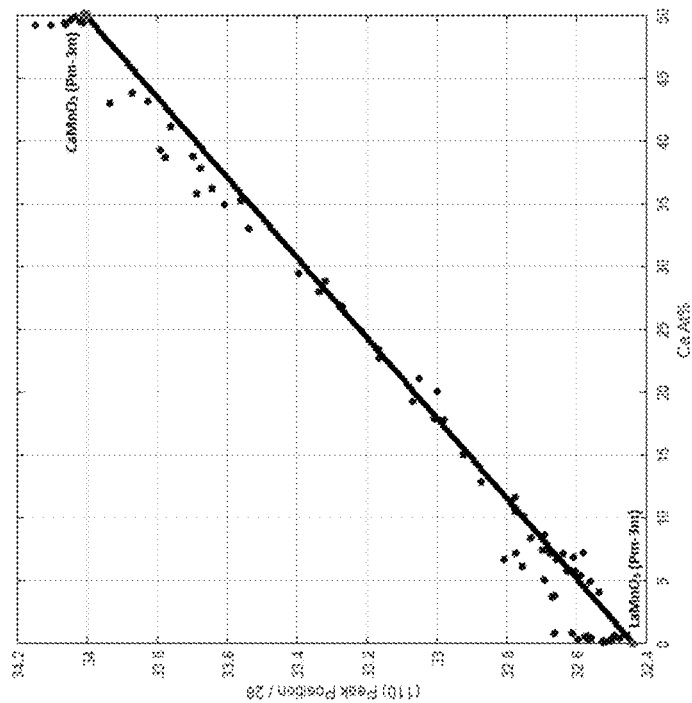
FIGS. 8A and 8B show, with reference to the compositions of Example 2 of the present invention, (FIG. 8A) the compositional dependence of the (110) 2θ peak position of the perovskite as a function of composition for $La_{x-z}Ca_{1-x+w}Mn_{y+z+w}O_{3-\delta}$, and (FIG. 8B) The compositional dependence of the (110) 2θ peak position of the perovskite along the pseudo-binary tie-line (±2 at %) of $La_{x-z}Ca_{1-x+w}Mn_{y+z+w}O_{3-\delta}$; the black line indicates the limits of (110) 2θ peak position between $LaMnO_3$ (Pm-3m) [M. J. Sayagues et al., *Journal of Solid State Chemistry* 2012 188, 11-16] and $CaMnO_3$ (Pm-3m); the data has been obtained from XRD on 9 individual compositional gradient thin film libraries of $La_{x-z}Ca_{1-x+w}Mn_{y+z+w}O_{3-\delta}$ synthesised at 550° C. on the ITO of the electrochemical array substrate.
Figure 8A:
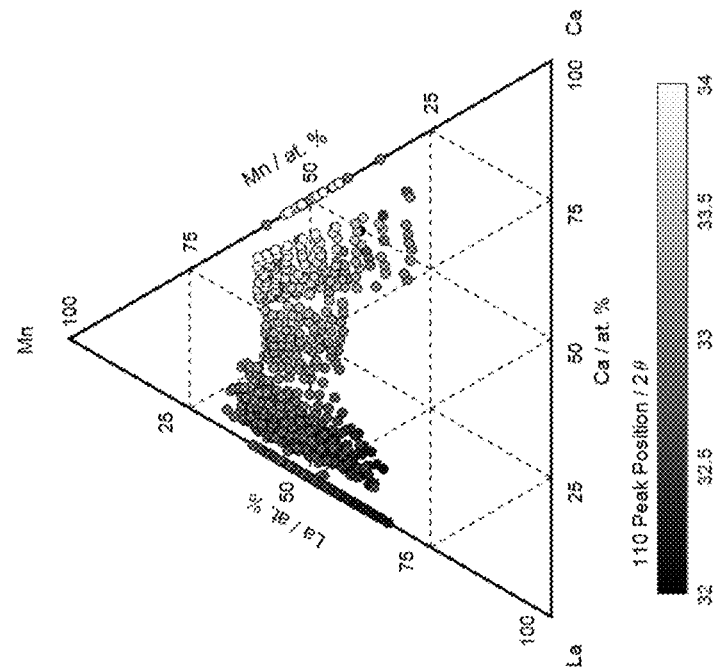
Figure 18:
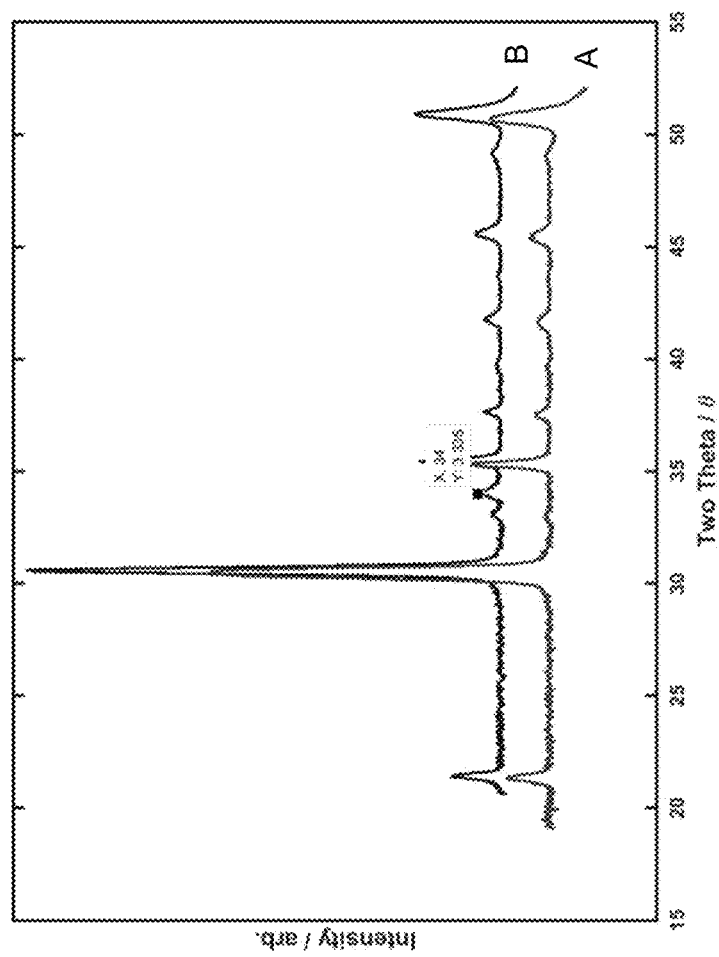
FIG. 18 shows XRD patterns for $La_{0.1}Ca_{0.68}Mn_{1.36}O_{3-\delta}$ according to Example 2 of the present invention, A) As synthesised and B) following a post anneal at 800° C.; the $La_{0.1}Ca_{0.68}Mn_{1.36}O_{3-\delta}$ has been synthesised on the ITO substrate of the electrochemical array. At these Ca rich compositions, the perovskite is not crystallised before annealing, and starts to crystallise after post annealing; the marked peak corresponds to the (110) Bragg peak of the cubic structure.

FIG. 7 shows the compositional region where perovskites were observed through a logarithmic plot of the sum of the (110), (111) and (200) peak areas to account any texturing of the thin films as for the case of the $La_{1-x}Mn_yNi_{1-y+x}O_{3-\delta}$ catalysts shown in FIG. 1. A sharp cut off in the presence of the perovskite is seen at higher calcium content with no perovskite peaks observed for compositions where the Ca:La ratio was greater than ca. 3:1. The diffraction patterns pertaining to compositions Ca:La>3:1 do not show the presence of peaks at any measured range, but are likely to be poorly crystallised perovskites: A library in this composition region was annealed, post deposition, at 800° C. in the presence of oxygen to promote crystallisation resulting in the appearance of a weak XRD peak corresponding to the (110) perovskite Bragg peak (FIG. 18). There was a minimal change observed in the electrochemical performance following post annealing. Along the perovskite pseudo-binary composition line $La_{x-z}Ca_{1-x+w}Mn_{y+z+w}O_{3-\delta}$, a continuous A-site substitution in a cubic (Pm-3m) to orthorhombic (Pnma) perovskite solid solution is exhibited (FIG. 8A): this is directly evidenced in the linear shift in the (110) Bragg peak position peak as a function of composition (FIG. 8B).

Figure 9:
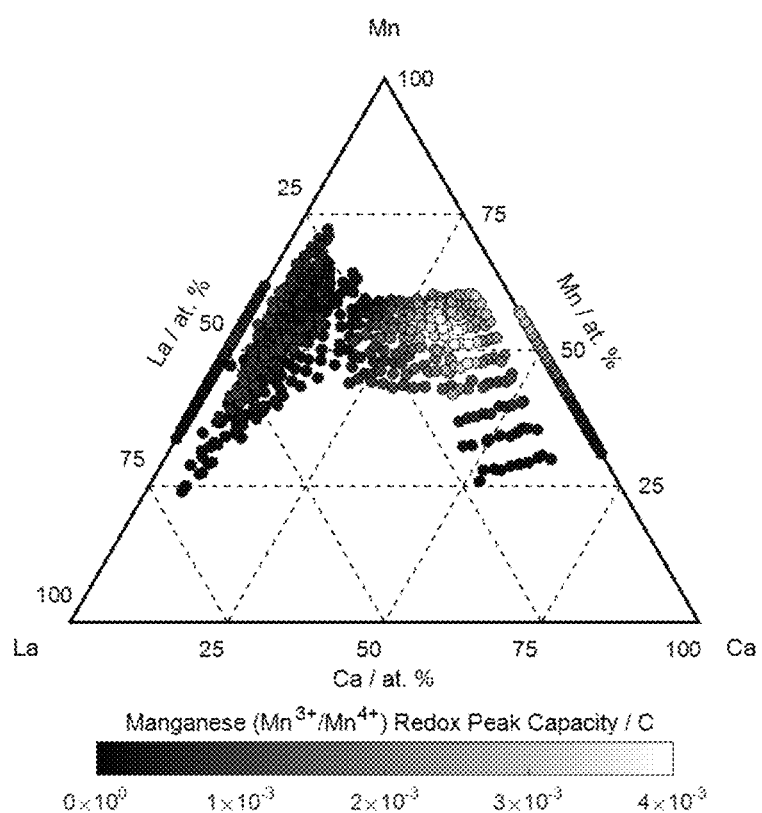
FIG. 9 shows, with reference to the compositions of Example 2 of the present invention, the compositional dependence of the charge associated with $Mn^{3+}/Mn^{4+}$ redox couple (integrating the anodic peak over the potential range $0.9 < V_{RHE} < 1.15$) on $La_{x-z}Ca_{1-x+w}Mn_{y+z+w}O_{3-\delta}$ electrocatalysts; the data has been extracted from cyclic voltammetry (0.1 M KOH electrolyte, 5 mVs$^{-1}$ scan rate, room temperature) recorded in deoxygenated 0.1 M KOH, on a series of $La_{x-z}Ca_{1-x+w}Mn_{y+z+w}O_{3-\delta}$ electrocatalyst thin film libraries.
Figure 19:
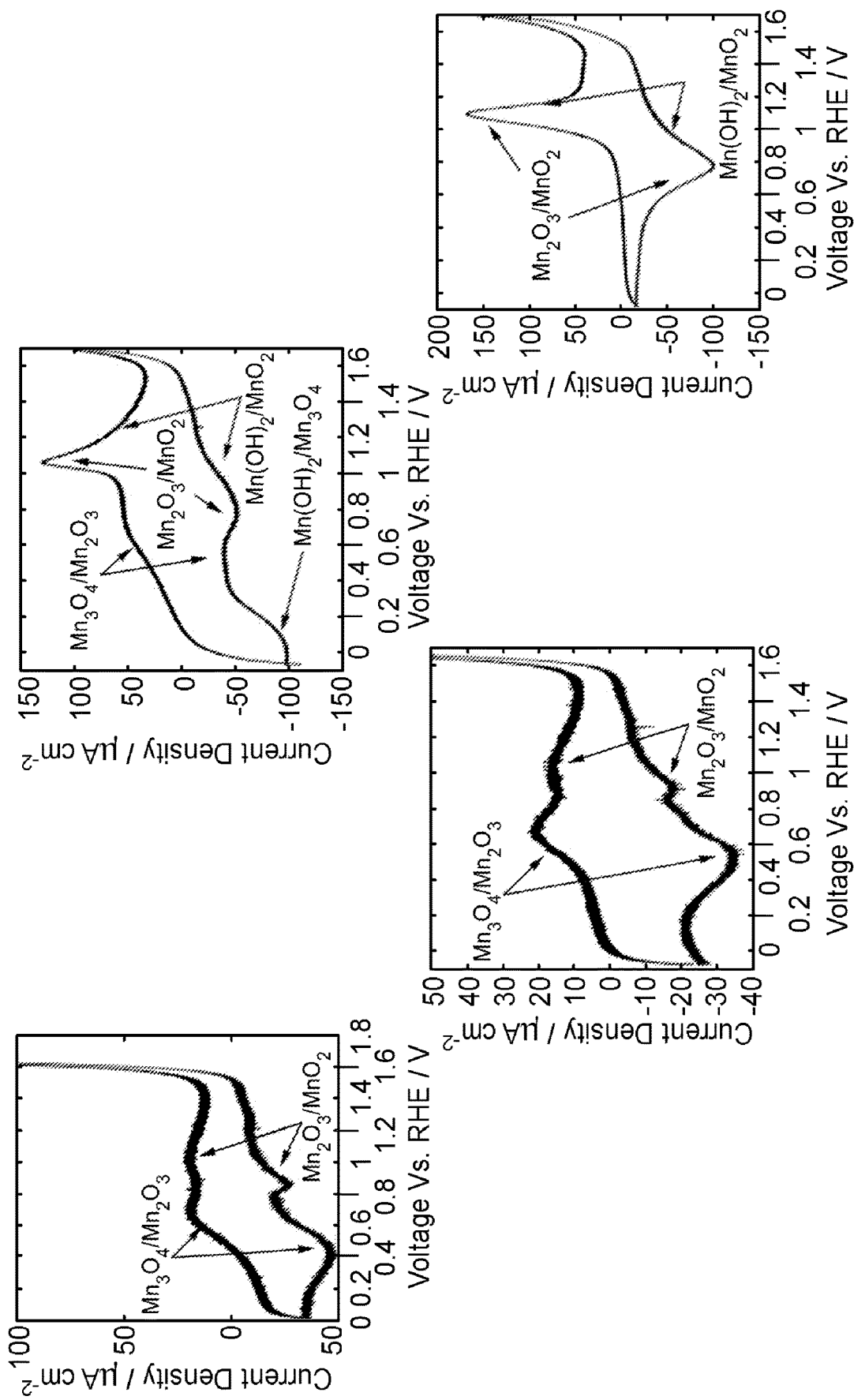
FIG. 19 shows selected cyclic voltammograms (5 mVs$^{-1}$ scan rate, room temperature) recorded in deoxygenated 0.1 M KOH at various compositions of the $La_{x-z}Ca_{1-x+w}Mn_{y+z+w}O_{3-\delta}$ thin film electrocatalysts showing the most prominent redox couples in the system.

In the absence of dissolved oxygen, three manganese redox couples can be identified in the cyclic voltammetry (FIG. 19). The $Mn^{2+}/Mn^{3+}$, $Mn^{3+}/Mn^{4+}$ and $Mn^{2+}/Mn^{4+}$ couples centred at $0.6V_{RHE}$, $0.9<V_{RHE}<1.0$ and $1.1V_{RHE}$ respectively, are identified over the compositional range of $La_{x-z}Ca_{1-x+w}Mn_{y+z+w}O_{3-\delta}$ investigated. The $Mn^{2+}/Mn^{3+}$ couple is identified at potentials which shift with composition in the region 0.4 to $0.8V_{RHE}$ and is present across the $La_{x-z}Ca_{1-x+w}Mn_{y+z+w}O_{3-\delta}$ perovskites compositional range. Substitution of Ca in the lattice results in a reduction in the charge associated with the $Mn^{2+}/Mn^{3+}$ couple (Celorrio, V.; et al. *ChemElectroChem* 2016, 3 (2), 283-291). The $Mn^{3+}/Mn^{4+}$ couple observed at potentials $0.9-1.2V_{RHE}{}^1$, is in the same potential range where the couple is observed in $La_{1-x}$ $Mn_yNi_{1-y+x}O_{3-\delta}$ (FIG. 19). With the increasing calcium content, the peak is seen to shift to higher potentials. But most importantly, the integrated charge density of this couple increases with Ca substitution in $La_{x-x}Ca_{1-x+w}$ $Mn_{y+z+w}O_{3-\delta}$. The integrated charge of the anodic peak of this couple is plotted as a function of composition in FIG. 9. An increase in the Ca content in $La_xCa_{1-x}Mn_yO_{3-\delta}$ along the pseudo-binary composition line results in an increase in the charge associated with the $Mn^{3+}/Mn^{4+}$ couple with a maximum at $La_{0.3}Ca_{0.7}MnO_{3-\delta}$. A slightly higher maximum in the charge is observed for $La_{0.3}Ca_{0.6}Mn_{1.1}O_{3-\delta}$. At higher concentrations of Ca, this couple decreases in charge, and the $Mn^{2+}/Mn^{4+}$ couple predominates in $CaMnO_3$ (this is why a current is still observed for the high Ca samples despite a lack of the $Mn^{3+}/Mn^{4+}$ couple; the $Mn^{2+}/Mn^{4+}$ peaks are large and broad, thus making complete dissociation difficult). This observation is consistent with the model in which the introduction of a divalent ion such as Ca in the A-site causes a charge deficiency in the structure resulting in the generation of $Mn^{4+}$ at the B-site (Zener et al., cited above). As was observed in the case of $La_{1-x}Mn_y Ni_{1-y+x}O_{3-\delta}$ (FIG. 3C), the generation of the $Mn^{3+}/Mn^{4+}$ couple is associated with the formation of $Mn^{4+}$ in the lattice.

Figure 10A:
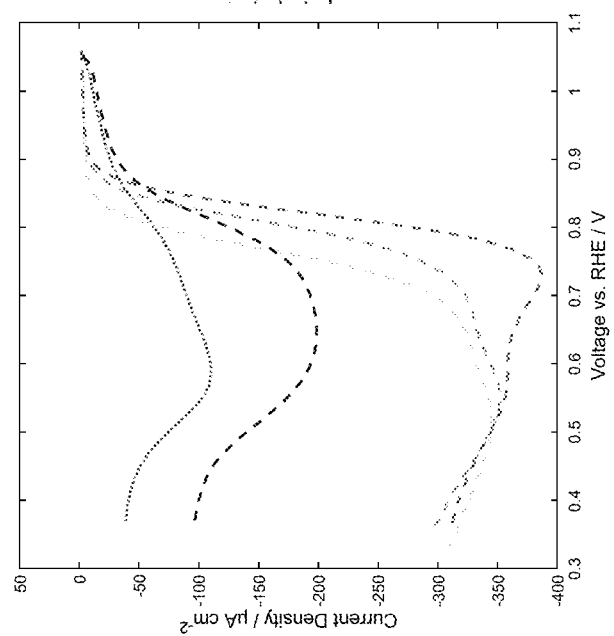
Figures 11A, 11B:
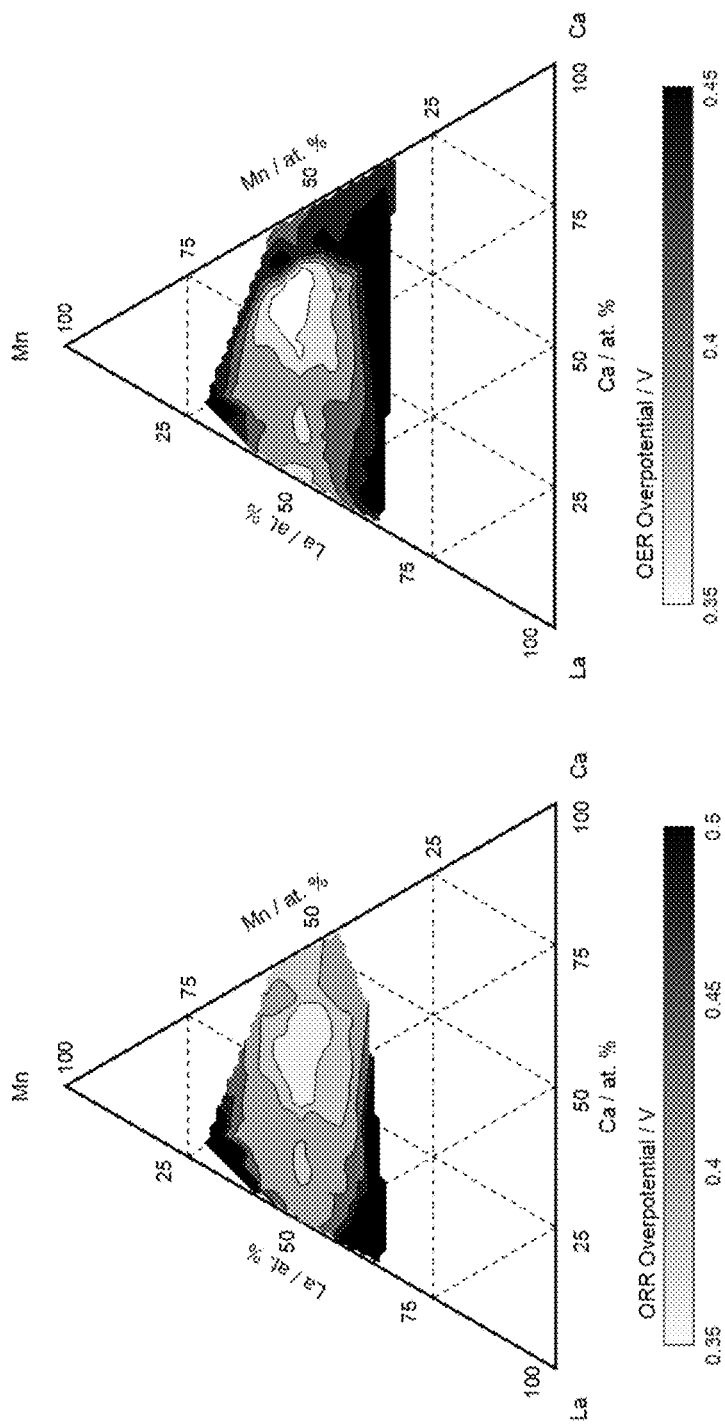

The oxygen reduction reaction (ORR) and oxygen evolution reaction (OER) were measured on the catalyst libraries using cyclic voltammetry. Examples of ORR activities (measured in cyclic voltammetry) in cathodic sweeps of a series of catalysts with pseudo-binary compositions measured in oxygen saturated electrolyte are shown in FIG. 10A. An ignition potential for the ORR reaction has been extracted (at a current of −70 μA cm$^{-2}$) and reported an effective overpotential with respect to the reversible oxygen potential of 1.23 V, and this is shown as a function of composition of $La_{x-z}Ca_{1-x+w}Mn_{y+z+w}O_{3-\delta}$ in FIG. 11A. The ORR activity is seen to be good at all compositions along the pseudo-binary compositions of $La_xCa_{1-x}Mn_yO_{3-\delta}$, however the addition of calcium to $LaMnO_3$ (which shows the highest overpotential) results in a continuous reduction in the ORR overpotential. The lowest overpotential for the ORR reaction was observed for a calcium A-site substituted lattice composition of $La_{0.3}Ca_{0.6}Mn_{1.1}O_{3-\delta}$ of 0.362 V, along the pseudo-binary line, the highest overpotential was 0.368 V for $La_{0.3}Ca_{0.7}MnO_{3-\delta}$.

Figure 10B:
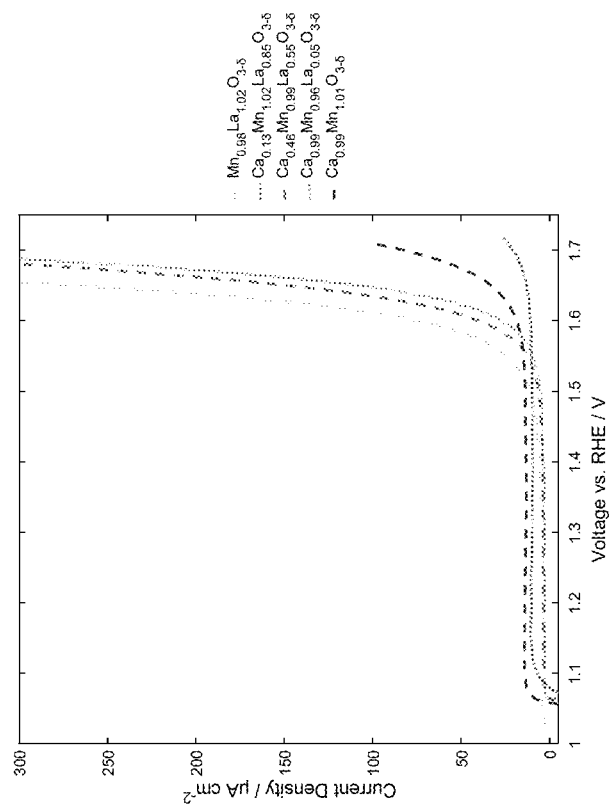

Examples of OER activities (measured in cyclic voltammetry) in anodic sweeps of a series of catalysts with pseudo-binary compositions measured in oxygen free electrolyte are shown in FIG. 10B. The effective overpotential for the OER reaction (extracted from the ignition potential at 40 μA cm$^{-2}$) is shown as a function of composition in $La_xCa_{1-x}Mn_yO_{3-\delta}$ in FIG. 11B. The overpotential for OER is relatively low on $LaMnO_3$. $LaMnO_3$ also exhibits the highest overpotential for ORR. The introduction of Ca in $LaMnO_3$ initially results in an increase in the OER overpotential in $La_{x-z}Ca_{1-x+w}Mn_{y+z+w}O_{3-\delta}$ up to ca. 20% Ca. The ORR reaction exhibits a reduction in overpotential with increase in Ca concentration for these compositions. These compositions (for Ca<20%) of $La_{x-z}Ca_{1-x+w}Mn_{y+z+w}O_{3-\delta}$ are therefore characterised by an anti-correlation of OER and ORR activities.

Figure 12B:
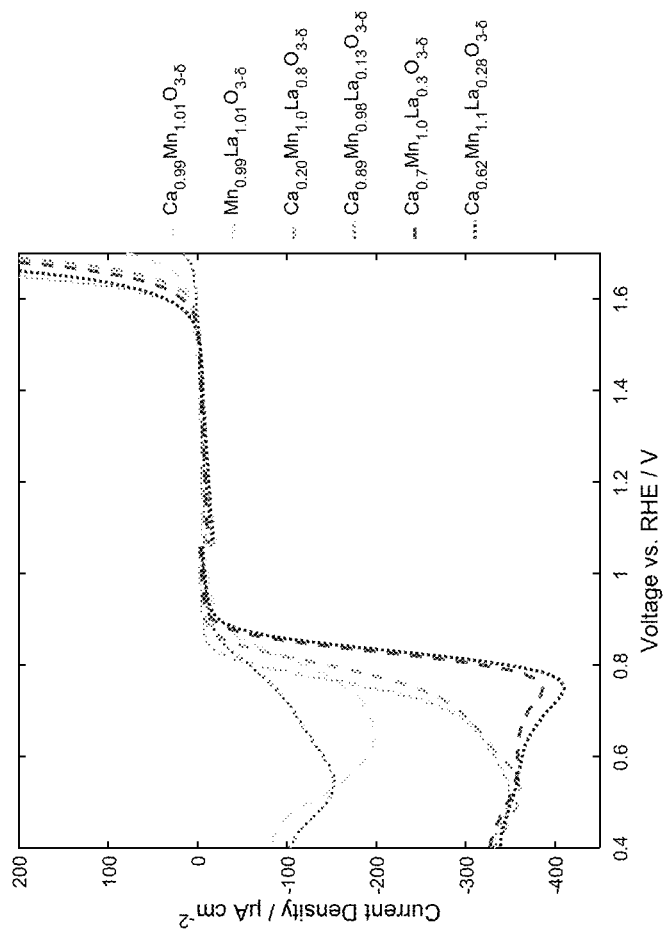
FIGS. 12A and 12B show, with reference to the compositions of Example 2 of the present invention, the compositional dependence of the reversibility of the ORR/OER on $La_{x-z}Ca_{1-x+w}Mn_{y+z+w}O_{3-\delta}$ thin film electrocatalysts expressed as the difference between the ORR and OER overpotentials shown in FIG. 11.
Figure 12A:
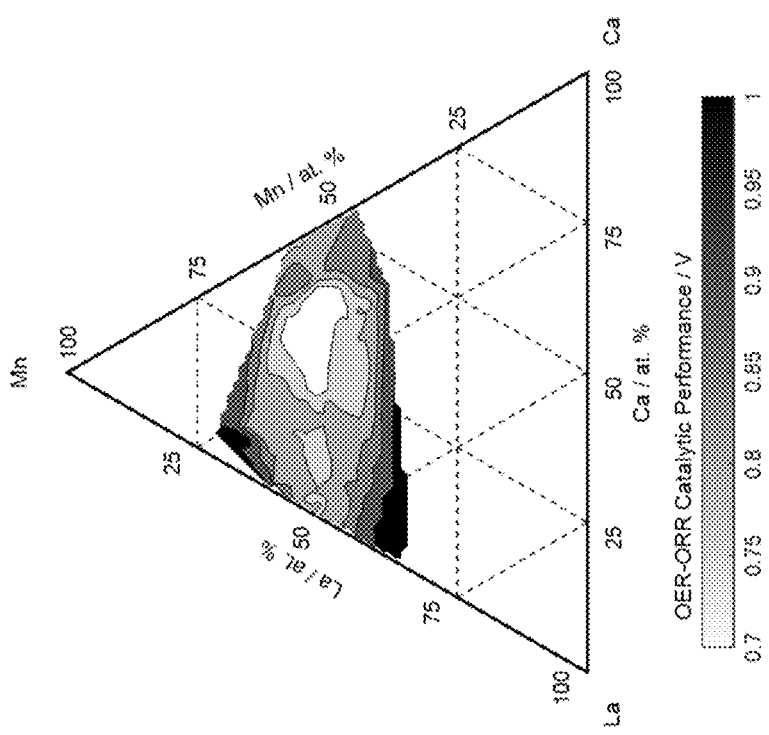

However, a decrease in the overpotential for the OER is observed in $La_{x-z}Ca_{1-x+w}Mn_{y+z+w}O_{3-\delta}$ for concentrations above ca. 20% Ca: a continuing reduction in ORR overpotential is also observed. This results in a region of $La_{x-z}Ca_{1-x+w}Mn_{y+z+w}O_{3-\delta}$ compositions according to the present invention which exhibit a high activity for both OER and ORR reactions. This effect is again best exemplified in a plot of the difference between the OER and ORR potential as a function of composition: this reflects the effectiveness of the catalyst in the reversible reaction. This is shown in FIG. 12A, with some examples of the corresponding OER and ORR voltammograms shown in FIG. 12B. The region of highest reversible activity along the pseudo-binary composition line is centred at $La_{0.3}Ca_{0.7}MnO_{3-\delta}$ with the most reversible activity observed for $La_{0.3}Ca_{0.6}Mn_{1.1}O_{3-\delta}$. Comparison of FIG. 12A with FIG. 9 also reveals that the region of composition exhibiting the highest reversible activity also corresponds to the region of compositions exhibiting the most prominent $Mn^{3+}/Mn^{4+}$ redox activity.

The thin film combinatorial synthetic methodology as described above can therefore be successfully to synthesise libraries of hundreds of thin film $La_{x1-x}Mn_yNi_{1-y+x}O_{3-\delta}$ (Example 1) and $La_{x-z}Ca_{1-x+w}Mn_{y+z+w}O_{3-\delta}$ (Example 2) perovskite electrocatalysts. These two ternary perovskites are examples of B-site and A-site substitution along the pseudo-binary composition lines, respectively.

X-ray diffraction has been used to characterise the perovskite structures of both of the above Examples. In both cases, XRD shows there is a large region of compositions away from these lines where a perovskite structure is observed. In the case of $La_{1-x}Mn_yNi_{1-y+x}O_{3-\delta}$ there appears to be a continual distortion of the $LaMnO_3$ cubic structure to a rhombohedral $LaNiO_3$ structure along the tie-line. There is, however, evidence of some A-site substitution of $Mn^{2+}$ in the $LaMnO_3$, and more extensive A-site substitution of $Ni^{2+}$ in La sub-stoichiometric compositions of $La_{1-x}Mn_y Ni_{1-y+x}O_{3-\delta}$. In the case of the $La_{x-z}Ca_{1-x+w}O_{3-\delta}$ perovskites, there appears to be a continual distortion of the $LaMnO_3$ cubic structure (Pm-3m) to an orthorhombic structure (Pnma) in $La_xCa_{1-x}Mn_yO_{3-\delta}$, and with a change back to a cubic (Pm-3m) structure in $CaMnO_3$.

High throughput electrochemical screening has been undertaken a systematic study of the surface redox behaviour, and the oxygen reduction reaction (ORR) and oxygen evolution reaction (OER) on the synthesised perovskites. In the case of $La_{1-x}Mn_yNi_{1-y+x}O_{3-\delta}$ compositions along the tie-line (Example 1), there is an anti-correlation in the ORR and OER activities. We identify, however, a highly preferred region of catalyst compositions according to the present invention with lanthanum A-site sub-stoichiometry where both high ORR and OER activity is observed, and this also correlates with the appearance of the $Mn^{3+}/Mn^{4+}$ redox couple. The optimal reversible ORR/OER activity is observed for $La_{0.85}Mn_{0.7}Ni_{0.45}O_{3-\delta}$. This compositional region of reversible ORR/OER electro-catalytic activity and $Mn^{3+}/Mn^{4+}$ redox activity also corresponds to compositions where A-site substitution of $La^{3+}$ by $Ni^{2+}$ was suggested based on the X-ray diffraction results.

Without wishing to be bound by theory, it is suggested that the appearance of the $Mn^{3+}/Mn^{4+}$ couple is associated with the creation of $Mn^{4+}$ in the bulk as $Mn^{3+}$ is substituted by $Ni^{2+}$ at the A-site to create a mixed valent system.

To support this interpretation, we also show (Example 2) that a direct A-site substitution of $La^{3+}$ by the divalent $Ca^{2+}$ cation in $La_{x-z}Ca_{1-x+w}Mn_{y+z+w}O_{3-\delta}$ perovskites, which is expected to result in the mixed valent $Mn^{2+}$ and $Mn^{4+}$ perovskite, also results in the appearance of the $Mn^{3+}/Mn^{4+}$ redox couple in cyclic voltammetry centred near to the tie-line, with the maximum charge observed for $La_{0.3}Ca_{0.6}Mn_{1.1}O_{3-\delta}$. We also show that the compositional distribution of catalysts which exhibit the most reversible ORR/OER electrocatalysts also correlates with the presence of the $Mn^{3+}/Mn^{4+}$ redox couple.

In these two La-Mn based perovskite systems investigated, therefore, La A-site substitution by a divalent cation (either $Ni^{2+}$ or $Ca^{2+}$) which results in the creation of a mixed valent $Mn^{3+}$ and $Mn^{4+}$ bulk lattice also results in the appearance of the $Mn^{3+}/Mn^{4+}$ redox couple. The appearance of the $Mn^{3+}/Mn^{4+}$ redox couple is also shown to be responsible for the creation of the most active reversible ORR/OER electrocatalysts according to the present invention. These observations are consistent with ab initio calculations on Mn oxides which predict the active site for ORR being HO* on $Mn^{3+}$ and for OER is O* on $Mn^{4+}$. It is this single bifunctional site mediating the $Mn^{3+}/Mn^{4+}$ redox couple in the perovskites resulting in the most reversible electrocatalysis. Mixed valent $Mn^{3+}$ and $Mn^{4+}$ in the bulk lattice of the perovskite appears to be sufficient to generate this active site. It is the proximity of the potential of the $Mn^{3+}/Mn^{4+}$ redox couple to the reversible ORR/OER potential in the alkali environment which results in the reversible activity. Without wishing to be bound by theory, it is suggested that a similar strategy of A-site substitution could be more widely used in producing mixed cation occupation at the B-site of perovskites generally, and the resulting couple tuned to support single (bifunctional) site reversible ORR/OER activity.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry and materials science or related fields are intended to be within the scope of the following claims.

What is claimed is:

1. A composition consisting essentially of a perovskite crystalline structure, the composition comprising:
    ions of a first metal $M^1$ which occupies an A-site of the perovskite crystalline structure;
    ions of a second metal $M^2$ which occupies a B-site of the perovskite crystalline structure, $M^2$ having two oxidation states capable of forming a redox couple suitable for reversibly catalyzing an oxygen reduction reaction (ORR) and an oxygen evolution reaction (OER);
    ions of a third metal $M^3$, at least a portion of which substitutes for $M^1$ in the A-site of the perovskite crystalline structure, and at least a portion of which optionally also substitutes for $M^2$ in the B-site of the perovskite crystalline structure, at least some of the ions of $M^3$ having a different oxidation state to the ions of $M^1$;
    and atoms of an element X, which is a chalcogen;
    wherein the ions of the metals $M^1$, $M^2$ and $M^3$ are present in atomic ratios within the ranges (a) or (b):
        (a) 25 to 49.9 atomic % $M^1$, 30 to 60 atomic % $M^2$, and 5 to 45 atomic % $M^3$;
        (b) 10 to 30 atomic % $M^1$, 50.1 to 60 atomic % $M^2$, and 25 to 45 atomic % $M^3$;
    each expressed as a percentage of the total metal ions in the composition excluding oxygen;
    wherein presence of the ions of $M^3$ causes a change in an oxidation state of some of the ions of $M^2$ in the perovskite crystal structure, thereby creating the redox couple suitable for reversibly catalyzing the ORR and OER; and
    wherein the ions of the metals $M^1$, $M^2$ and $M^3$ are present in atomic ratios (a1):
        (a1) 35 to 45 atomic % $M^1$, 30 to 45 atomic % $M^2$, and 15 to 25 atomic % $M^3$; all expressed as a percentage of the total metal ions in the composition excluding oxygen.

2. The composition according to claim 1, wherein at least some of the ions of $M^3$ are in an oxidation state which is capable of oxidising some of the ions of $M^2$ in the perovskite crystal structure, thereby creating the redox couple suitable for reversibly catalyzing the ORR and OER.

3. The composition according to claim 1, wherein $M^1$ is a trivalent metal.

4. The composition according to claim 3, wherein $M^1$ is selected from the group consisting of Y, La, Pr, Nd, Pm, Sm, Eu, Gd, Tb, Dy, Ho, Er, Tm, Yb, Lu, Sb and Bi.

5. The composition according to claim 3, wherein $M^1$ is La.

6. The composition according to claim 1, wherein $M^2$ is a trivalent metal capable of oxidation to a tetravalent oxidation state to form the redox couple.

7. The composition according to claim 6, wherein $M^2$ is Mn.

8. The composition according to claim 1, wherein $M^2$ is selected from the group consisting of Ti, V, Cr, Mn, Fe, Co, Ni, Cu, Zr, Nb, Mo, Tc, Ru, Rh, Pd, and Ag.

9. The composition according to claim 1, wherein $M^3$ is a divalent or trivalent metal.

10. The composition according to claim 1, wherein $M^3$ is selected from the group consisting of Mg, Ca, Ti, V, Cr, Mn, Fe, Co, Ni, Cu, Y, Zr, Nb, Mo, Tc, Ru, Rh or Pd.

11. The composition according to claim 10, wherein $M^3$ is Ni.

12. The composition according to claim 10, wherein $M^3$ is Ca.

13. The composition according to claim 1, wherein $M^1$ is La, $M^2$ is Mn and $M^3$ is Ca.

14. The composition according to claim 13, wherein the composition comprises 15 to 25 atomic % La, 51 to 58 atomic % Mn, and 25 to 35 atomic % Ca, all expressed as a percentage of the total metal atoms in the composition excluding oxygen.

15. The composition according to claim 1, which is formed as a nanoparticle.

16. The composition according to claim 15, wherein the nanoparticle is supported on a support.

17. The composition according to claim 1, wherein neither $M^1$ nor $M^3$ is Sr.

18. The composition according to claim 1, wherein the composition does not have the formula $La_{1-y}Sr_yZO_3$, wherein y is greater than 0 and less than 1, and Z is a transition metal.

19. The composition according to claim 1, wherein the composition does not have the formula $La_{1-y}Sr_yZO_3$, wherein y is greater than 0 and less than 1, and Z is selected from the group consisting of Co, Cu, Fe, Mn, and Ni.

20. A core-shell composition comprising (a) a core particle comprising a first composition; and (b) a second, different composition applied as a shell on the core particle, wherein either the first or the second composition is the composition according to claim 1.

21. A method of preparing the composition according to claim 1, the method comprises providing a source of each component element of the composition, wherein the sources comprise at least a source of the ions of $M^1$, a source of the ions of $M^2$, a source of the ions of $M^3$, and a source of the atoms of X; and depositing the sources of each element onto a substrate, wherein the component elements from the sources react on the substrate to form the composition consisting essentially of the perovskite crystalline structure.

22. The method according to claim 21, the method comprising forming the crystalline composition in the form of a film on the substrate.

23. A method of using a composition, comprising:
    providing the composition according to claim 1;
    using the composition as a catalyst.

24. The method according to claim 23, wherein the catalyst catalyses the oxygen reduction reaction (ORR) and the oxygen evolution reaction (OER).

25. An electrode comprising the composition according to claim 1.

26. A cell comprising:
an anode;
a cathode;
an electrolyte;
wherein the anode and/or the cathode includes a catalyst comprising the composition according to claim 1.

27. The cell according to claim 26, which is a fuel cell.

28. The cell according to claim 27, which is a regenerative fuel cell.

29. The cell according to claim 27, which is an alkaline fuel cell.

30. The cell according to claim 26, which is a metal-air cell.

31. A composition consisting essentially of a perovskite crystalline structure, the composition comprising:
ions of a first metal $M^1$ which occupies an A-site of the perovskite crystalline structure;
ions of a second metal $M^2$ which occupies a B-site of the perovskite crystalline structure, $M^2$ having two oxidation states capable of forming a redox couple suitable for reversibly catalyzing an oxygen reduction reaction (ORR) and an oxygen evolution reaction (OER);
ions of a third metal $M^3$, at least a portion of which substitutes for $M^1$ in the A-site of the perovskite crystalline structure, and at least a portion of which optionally also substitutes for $M^2$ in the B-site of the perovskite crystalline structure, at least some of the ions of $M^3$ having a different oxidation state to the ions of $M^1$; and
atoms of an element X, which is a chalcogen;
wherein the ions of the metals $M^1$, $M^2$ and $M^3$ are present in atomic ratios within the ranges (a) or (b):
(a) 25 to 49.9 atomic % $M^1$, 30 to 60 atomic % $M^2$, and 5 to 45 atomic % $M^3$;
(b) 10 to 30 atomic % $M^1$, 50.1 to 60 atomic % $M^2$, and 25 to 45 atomic % $M^3$;
each expressed as a percentage of the total metal ions in the composition excluding oxygen;
wherein presence of the ions of $M^3$ causes a change in an oxidation state of some of the ions of $M^2$ in the perovskite crystal structure, thereby creating the redox couple suitable for reversibly catalyzing the ORR and OER; and
wherein the ions of the metals $M^1$, $M^2$ and $M^3$ are present in atomic ratios (b1):
(b1) 15 to 25 atomic % $M^1$, 51 to 58 atomic % $M^2$, and 25 to 35 atomic % $M^3$; all expressed as a percentage of the total metal ions in the composition excluding oxygen.

32. The composition of claim 31, wherein $M^1$ is selected from the group consisting of Y, La, Pr, Nd, Pm, Sm, Eu, Gd, Tb, Ky, Ho, Er, Tm, Yb, Lu, Sb and Bi.

33. The composition of claim 31, wherein $M^2$ is selected from the group consisting of Ti, V, Cr, Mn, Fe, Co, Ni, Cu, Zr, Nb, Mo, Tc, Ru, Rh, Pd, and Ag.

34. The composition of claim 31, wherein $M^3$ is selected from the group consisting of Mg, Ca, Ti, V, Cr, Mn, Fe, Co, Ni, Cu, Y, Zr, Nb, Mo, Tc, Ru, Rh or Pd.

35. The composition of claim 31, wherein the composition does not have the formula $La_{1-y}Sr_yZO_3$, wherein y is greater than 0 and less than 1, and Z is selected from the group consisting of Co, Cu, Fe, Mn, and Ni.

36. A core-shell composition comprising (a) a core particle comprising a first composition; and (b) a second, different composition applied as a shell on the core particle, wherein either the first or the second composition is the composition according to claim 31.

37. An electrode comprising the composition according to claim 31.

38. A cell comprising:
an anode;
a cathode; and
an electrolyte;
wherein the anode and/or the cathode includes a catalyst comprising the composition according to claim 31.

39. The cell according to claim 38, which is a regenerative fuel cell.

40. A composition consisting essentially of a perovskite crystalline structure, the composition comprising:
ions of a first metal $M^1$ which occupies an A-site of the perovskite crystalline structure;
ions of a second metal $M^2$ which occupies a B-site of the perovskite crystalline structure, $M^2$ having two oxidation states capable of forming a redox couple suitable for reversibly catalyzing an oxygen reduction reaction (ORR) and an oxygen evolution reaction (OER);
ions of a third metal $M^3$, at least a portion of which substitutes for $M^1$ in the A-site of the perovskite crystalline structure, and at least a portion of which optionally also substitutes for $M^2$ in the B-site of the perovskite crystalline structure, at least some of the ions of $M^3$ having a different oxidation state to the ions of $M^1$; and
atoms of an element X, which is a chalcogen;
wherein the ions of the metals $M^1$, $M^2$ and $M^3$ are present in atomic ratios within the ranges (a) or (b):
(a) 25 to 49.9 atomic % $M^1$, 30 to 60 atomic % $M^2$, and 5 to 45 atomic % $M^3$;
(b) 10 to 30 atomic % $M^1$, 50.1 to 60 atomic % $M^2$, and 25 to 45 atomic % $M^3$;
each expressed as a percentage of the total metal ions in the composition excluding oxygen;
wherein presence of the ions of $M^3$ causes a change in an oxidation state of some of the ions of $M^2$ in the perovskite crystal structure, thereby creating the redox couple suitable for reversibly catalyzing the ORR and OER;
wherein $M^1$ is La, $M^2$ is Mn and $M^3$ is Ni; and
wherein the composition comprises 35 to 45 atomic % La, 40 to 45 atomic % Mn, and 15 to 20 atomic % Ni, all expressed as a percentage of the total metal atoms in the composition excluding oxygen.

41. A core-shell composition comprising (a) a core particle comprising a first composition; and (b) a second, different composition applied as a shell on the core particle, wherein either the first or the second composition is the composition according to claim 40.

42. An electrode comprising the composition according to claim 40.

43. A cell comprising:
an anode;
a cathode; and
an electrolyte;
wherein the anode and/or the cathode includes a catalyst comprising the composition according to claim 40.

44. The cell according to claim 43, which is a regenerative fuel cell.

* * * * *